(12) United States Patent  
Fukunaga

(10) Patent No.: US 8,849,026 B2  
(45) Date of Patent: Sep. 30, 2014

(54) METHOD OF ADJUSTING OUTPUT LEVEL OF MEASUREMENT PIXEL, COLOR SENSOR AND VIRTUAL SLIDE APPARATUS

(75) Inventor: Yasuhiro Fukunaga, Tokyo (JP)

(73) Assignee: Olympus Corporation, Tokyo (JP)

( * ) Notice: Subject to any disclaimer, the term of this patent is extended or adjusted under 35 U.S.C. 154(b) by 127 days.

(21) Appl. No.: 13/339,540

(22) Filed: Dec. 29, 2011

(65) Prior Publication Data

US 2012/0183218 A1 Jul. 19, 2012

(30) Foreign Application Priority Data

Jan. 17, 2011 (JP) ................................. 2011-007138

(51) Int. Cl.
*G06K 9/00* (2006.01)
*G01J 3/51* (2006.01)
*H04N 9/04* (2006.01)
*H04N 5/353* (2011.01)
*H04N 5/235* (2006.01)

(52) U.S. Cl.
CPC ................ *G01J 3/513* (2013.01); *H04N 9/045* (2013.01); *H04N 5/3537* (2013.01); *H04N 5/2353* (2013.01)
USPC ....................................................... 382/167

(58) Field of Classification Search
USPC ............ 382/162, 167, 312; 348/222.1, 223.1, 348/230.1, 251–252, 254, 273, 362, 587; 358/446–448, 518
See application file for complete search history.

(56) References Cited

U.S. PATENT DOCUMENTS

| | | | | |
|---|---|---|---|---|
| 4,912,558 A * | 3/1990 | Easterly et al. | ................ | 358/447 |
| 7,061,529 B2 * | 6/2006 | Nakamura | .................. | 348/222.1 |
| 7,196,724 B2 * | 3/2007 | Suzuki et al. | .............. | 348/223.1 |
| 7,809,186 B2 * | 10/2010 | Takahashi | ...................... | 382/162 |
| 8,013,912 B2 * | 9/2011 | Kikuchi et al. | ............ | 348/230.1 |
| 8,477,384 B2 * | 7/2013 | Mizuguchi et al. | ........... | 358/471 |

FOREIGN PATENT DOCUMENTS

JP 2006-349623 A 12/2006

* cited by examiner

*Primary Examiner* — Jose Couso
(74) *Attorney, Agent, or Firm* — Westerman, Hattori, Daniels & Adrian, LLP

(57) ABSTRACT

A method of adjusting an output level of a measurement pixel may include a first step of selecting a type of a target sample from a plurality of previously determined sample type candidates, a second step of measuring an output level of a reference pixel based on light from the target sample incident on the reference pixel, a third step of selecting a level adjustment parameter associated with the type of the target sample selected in the first step, the plurality of candidates being associated with the type of the target sample, a fourth step of calculating a level adjustment amount of the measurement pixel, and a fifth step of adjusting the output level using the level adjustment amount when measuring an output level corresponding to the light from the target sample.

10 Claims, 15 Drawing Sheets

FIG. 2
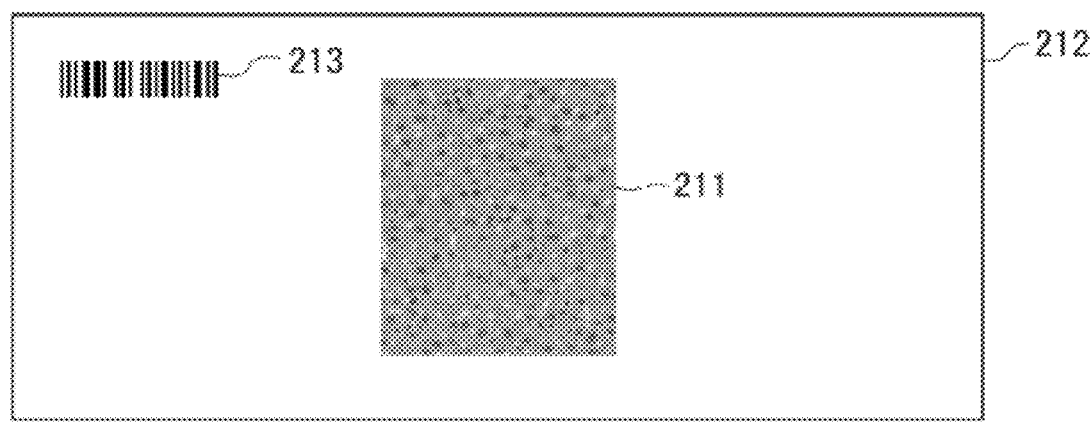
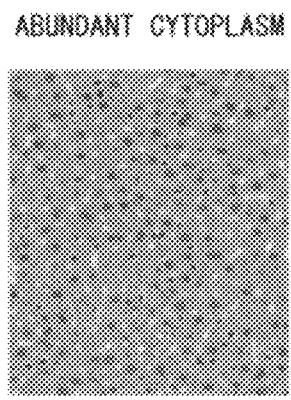
FIG. 3A
ABUNDANT CYTOPLASM
LIVER
PINK
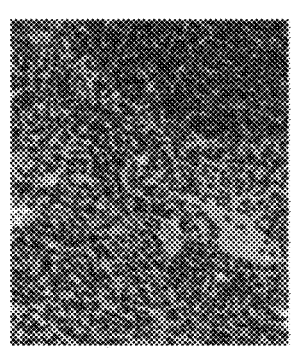
FIG. 3B
ABUNDANT NUCLEI
SPLEEN
PURPLE
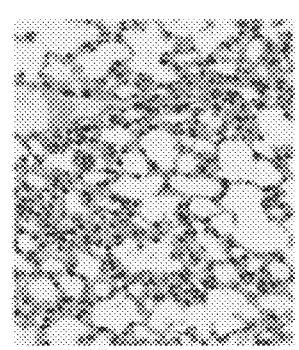
FIG. 3C
AMUNDANT EMPTINESS
LUNG
WHITE

FIG. 4

| PART | PIXEL | INTEGRATION TIME COEFFICIENT | |
|---|---|---|---|
| LIVER | PURPLE | 3.2 | ROW 101 |
| LIVER | BLUE | 0.9 | ROW 102 |
| LIVER | GREEN | 0.5 | ROW 103 |
| LIVER | YELLOW | 0.7 | ROW 104 |
| LIVER | RED | 0.8 | ROW 105 |
| LIVER | NO FILTER | 0.5 | ROW 106 |
| LUNG | PURPLE | 4.1 | ROW 107 |
| LUNG | BLUE | 1.2 | ROW 108 |
| LUNG | GREEN | 0.5 | ROW 109 |
| LUNG | YELLOW | 0.9 | ROW 110 |
| LUNG | RED | 0.4 | ROW 111 |
| LUNG | NO FILTER | 0.1 | ROW 112 |
| SPLEEN | PURPLE | 2.7 | ROW 113 |
| SPLEEN | BLUE | 0.7 | ROW 114 |
| SPLEEN | GREEN | 0.4 | ROW 115 |
| SPLEEN | YELLOW | 0.6 | ROW 116 |
| SPLEEN | RED | 0.7 | ROW 117 |
| SPLEEN | NO FILTER | 0.3 | ROW 118 |
| ⋮ | ⋮ | ⋮ | |

FIG. 10

| PART | PIXEL | GAIN COEFFICIENT | |
|---|---|---|---|
| LIVER | PURPLE | 1.6 | ROW 201 |
| LIVER | BLUE | 1.5 | ROW 202 |
| LIVER | GREEN | 1.2 | ROW 203 |
| LIVER | YELLOW | 1.4 | ROW 204 |
| LIVER | RED | 1.3 | ROW 205 |
| LIVER | NO FILTER | 1.2 | ROW 206 |
| LUNG | PURPLE | 1.5 | ROW 207 |
| LUNG | BLUE | 1.4 | ROW 208 |
| LUNG | GREEN | 1.1 | ROW 209 |
| LUNG | YELLOW | 1.3 | ROW 210 |
| LUNG | RED | 1.2 | ROW 211 |
| LUNG | NO FILTER | 1.0 | ROW 212 |
| SPLEEN | PURPLE | 1.3 | ROW 213 |
| SPLEEN | BLUE | 1.2 | ROW 214 |
| SPLEEN | GREEN | 0.9 | ROW 215 |
| SPLEEN | YELLOW | 0.1 | ROW 216 |
| SPLEEN | RED | 1.0 | ROW 217 |
| SPLEEN | NO FILTER | 0.8 | ROW 218 |
| ... | | ... | |

FIG. 13

| PART | PIXEL | GAIN COEFFICIENT | INTEGRATION TIME COEFFICIENT | |
|---|---|---|---|---|
| LIVER | PURPLE | 3.0 | 1.6 | ROW 301 |
| LIVER | BLUE | 2.8 | 0.5 | ROW 302 |
| LIVER | GREEN | 2.2 | 0.3 | ROW 303 |
| LIVER | YELLOW | 2.6 | 0.4 | ROW 304 |
| LIVER | RED | 2.1 | 0.2 | ROW 305 |
| LIVER | NO FILTER | 2.0 | 0.5 | ROW 306 |
| LUNG | PURPLE | 0.5 | 6.2 | ROW 307 |
| LUNG | BLUE | 0.4 | 1.8 | ROW 308 |
| LUNG | GREEN | 0.3 | 1.5 | ROW 309 |
| LUNG | YELLOW | 0.2 | 1.3 | ROW 310 |
| LUNG | RED | 0.1 | 1.1 | ROW 311 |
| LUNG | NO FILTER | 0.7 | 1.0 | ROW 312 |
| SPLEEN | PURPLE | 1.5 | 3.2 | ROW 313 |
| SPLEEN | BLUE | 1.4 | 0.9 | ROW 314 |
| SPLEEN | GREEN | 1.1 | 0.5 | ROW 315 |
| SPLEEN | YELLOW | 1.3 | 0.7 | ROW 316 |
| SPLEEN | RED | 1.2 | 0.8 | ROW 317 |
| SPLEEN | NO FILTER | 1.0 | 0.5 | ROW 318 |
| ⋮ | ⋮ | ⋮ | ⋮ | |

METHOD OF ADJUSTING OUTPUT LEVEL OF MEASUREMENT PIXEL, COLOR SENSOR AND VIRTUAL SLIDE APPARATUS

BACKGROUND OF THE INVENTION

1. Field of the Invention

The present invention relates to a method of adjusting an output level of a measurement pixel, a color sensor, and a virtual slide apparatus.

Priority is claimed on Japanese Patent Application No. 2011-007138, filed Jan. 17, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

To accurately detect spectral information of a subject, a photographing wavelength band needs to be divided into more channels. Further, a color sensor is used to obtain the spectral information of the subject. For example, a reading circuit disclosed in Japanese Unexamined Patent Application, First Publication No. 2006-349623 is known as a reading circuit used for the color sensor. In the following description and drawings, like elements are respectively denoted by like reference numerals.

FIG. 18 is a schematic diagram illustrating a configuration of a known color sensor. In the shown example, a color sensor 200 includes pixel and reading circuits B10-1 to B10-6, gain circuits B20-1 to B20-6, integration time calculation units 38-1 to 38-6, gain calculation units 39-1 to 39-6, and a driving control circuit 310. Further, the pixel and reading circuits B10-1 to B10-6 include pixels 31-1 to 31-6 for detecting spectral information of a subject in respective divided wavelength transmission bands, reference voltage terminals 32-1 to 32-6, switch elements 33-1 to 33-6, capacitive elements 34-1 to 34-6, and operational amplifiers 35-1 to 35-6. Further, sections including the reference voltage terminals 32-1 to 32-6, the switch elements 33-1 to 33-6, the capacitive elements 34-1 to 34-6, and the operational amplifiers 35-1 to 35-6 are referred to as reading circuits 30-1 to 30-6.

In the shown example, the pixels 31-1 to 31-6 included in the pixel and reading circuits B10-1 to B10-6 detect any of six colors: purple, blue, green, yellow, red and orange. Specifically, the pixel 31-1 included in the pixel and reading circuit B10-1 is a pixel for detecting violet light. Further, the pixel 31-2 included in the pixel and reading circuit B10-2 is a pixel for detecting blue light. Further, the pixel 31-3 included in the pixel and reading circuit B10-3 is a pixel for detecting green light. Further, the pixel 31-4 included in the pixel and reading circuit B10-4 is a pixel for detecting yellow light. Further, the pixel 31-5 included in the pixel and reading circuit B10-5 detects red light. Further, the pixel 31-6 included in the pixel and reading circuit B10-6 detects orange light.

In the color sensor 200, light from the subject is incident on the pixels 31-1 to 31-6. The switch elements 33-1 to 33-6 control integration times based on reference voltages applied to the reference voltage terminals 32-1 to 32-6. The capacitive elements 34-1 to 34-6 perform integration to obtain voltage changes according to photocurrent, and output the voltage changes to the output terminals of the operational amplifiers 35-1 to 35-6.

In the color sensor 200, the gain circuits B20-1 to B20-6 amplify and read output changes of the output terminals of the operational amplifiers 35-1 to 35-6. The integration time calculation units 38-1 to 38-6 calculate respective integration times of the pixel and reading circuits B10-1 to B10-6 based on information sent from the driving control circuit 310. The gain calculation units 39-1 to 39-6 calculate respective gains of the gain circuits B20-1 to B20-6 based on information sent from the driving control circuit 310. Using the integration times and the gains set by the integration time calculation units 38-1 to 38-6 and the gain calculation units 39-1 to 39-6, output signals are output from the output terminals 37-1 to 37-6.

Further, voltages $V_{out}$ output from the output terminals 37-1 to 37-6 may be represented by Equation (1), in which the reference voltage is $V_{ref}$, the photocurrent generated in the pixels 31-1 to 31-6 is $I_{PD}$, the time for which the photocurrent $I_{PD}$ is integrated by opening the switch elements 33-1 to 33-6 is $T_{INT}$, the capacitance of the capacitive elements 34-1 to 34-6 is C, and the gain of the gain circuits B20-1 to B20-6 is G.

$$V_{out} = V_{ref} + G \cdot \frac{I_{PD} T_{INT}}{C} \quad (1)$$

FIG. 19 is a graph illustrating an example of output levels of signals output from the output terminals 37-1 to 37-6 when integration times of the outputs of the pixels 31-1 to 31-6 for detecting light of any of the six colors are changed to an integer multiple of a reference integration time in a method disclosed in Japanese Unexamined Patent Application, First Publication No. 2006-349623. A vertical axis of the shown graph indicates output levels of signals based on output signals of the pixels 31-1 to 31-6, which are output from the output terminals 37-1 to 37-6. If the output level of the signal is equal to or higher than the noise level, and equal to or lower than a saturation level, the signal can be used when the spectral information is acquired. The noise level is a low output level that cannot be discriminated from noise. Further, the saturation level is a high output level exceeding the capacitance of the capacitive element included in the color sensor. Hereinafter, an output level equal to or higher than the noise level and equal to or lower than a saturation level is described as a valid level. Further, a horizontal axis of the shown graph indicates the output terminals 37-1 to 37-6 that output the signals based on the output signals of the pixels 31-1 to 31-6 in the first to sixth read-outs.

Specifically, (1) on a horizontal axis indicates the output terminal 37-1 that outputs the signal based on the output signal of the pixel 31-1 for detecting violet light in the first to sixth read-outs, and a value on the vertical axis corresponding to the horizontal axis (1) indicates the output level of the signal output from the output terminal 37-1. Further, (2) on the horizontal axis indicates the output terminal 37-2 that outputs the signal based on the output signal of the pixel 31-2 for detecting blue light in the first to sixth read-outs, and a value on the vertical axis corresponding to the horizontal axis (2) indicates the output level of the signal output from the output terminal 37-2. Further, (3) on the horizontal axis indicates the output terminal 37-3 that outputs the signal based on the output signal of the pixel 31-3 for detecting green light in the first to sixth read-outs, and a value on the vertical axis corresponding to the horizontal axis (3) indicates the output level of the signal output from the output terminal 37-3. Further, (4) on the horizontal axis indicates the output terminal 37-4 that outputs the signal based on the output signal of the pixel 31-4 for detecting yellow light in the first to sixth read-outs, and a value on the vertical axis corresponding to the horizontal axis (4) indicates the output level of the signal output from the output terminal 37-4. Further, (5) on the horizontal axis indicates the output terminal 37-5 that outputs the signal based on the output signal of the pixel 31-5 for detecting red light in the first to sixth read-outs, and a value on the vertical axis corresponding to the horizontal axis (5) indicates the output level of the signal output from the output terminal 37-5. Further, (6) on the horizontal axis indicates the output terminal 37-6 that outputs the signal based on the output signal of the pixel 31-6 for detecting orange light in the first to sixth read-outs, and a value on the vertical axis corresponding to the horizontal axis (6) indicates the output level of the signal output from the output terminal 37-6.

Further, in the shown example, the integration time in the first read-out is six times a reference integration time. Further, the integration time in the second read-out is five times the reference integration time. Further, the integration time in the third read-out is four times the reference integration time. Further, the integration time in the fourth read-out is three times the reference integration time. Further, the integration time in the fifth read-out is two times the reference integration time. Further, the integration time in the sixth read is equal to the reference integration time.

Thus, the integration times of the output signals of respective pixels 31-1 to 31-6 are changed to be integer multiples of the reference integration time and the output levels based on the output signals of the pixels 31-1 to 31-6 are read multiple times, such that the output levels based on the output signals of all the pixels 31-1 to 31-6 can be acquired as valid levels. In the shown example, the output level of the signal based on the output signal of the pixel 31-1, which is output from the output terminal 37-1, is read six times to acquire a valid output level. The output levels of the other output terminals 37-2 to 37-6 are read as shown. Further, in the graph, invalid output levels are indicated by a mark x.

However, in the method disclosed in Japanese Unexamined Patent Application, First Publication No. 2006-349623, since integration times of the output signals of the respective pixels 31-1 to 31-6 are changed to be integer multiples of the reference integration time and the output levels based on the output signals of the pixels 31-1 to 31-6 are read multiple times, invalid output levels are generated as shown by the mark x in FIG. 19. Thereby, in acquiring the output levels based on the output signals of all the pixels 31-1 to 31-6 as valid levels, invalid reads occur and the output levels need to be read multiple times, which increases an acquisition time.

SUMMARY

The present invention provides a method of adjusting an output level of a measurement pixel, a color sensor, and a virtual slide apparatus that are capable of shortening a time taken to acquire spectral information of a subject.

A method of adjusting an output level of a measurement pixel may include: a first step of selecting a type of a target sample from a plurality of previously determined sample type candidates; a second step of measuring an output level of a reference pixel based on light from the target sample incident on the reference pixel; a third step of selecting a level adjustment parameter associated with the type of the target sample selected in the first step from a plurality of level adjustment parameter candidates for adjusting an output level of a measurement pixel, the plurality of candidates being associated with the type of the target sample; a fourth step of calculating a level adjustment amount of the measurement pixel from the level adjustment parameter and the output level of the reference pixel; and a fifth step of adjusting the output level using the level adjustment amount when measuring an output level corresponding to the light from the target sample incident on the measurement pixel.

A plurality of measurement pixels may be provided. The plurality of measurement pixels may have different spectral sensitivity characteristics. The reference pixel may have a higher sensitivity than the plurality of measurement pixels at all detection wavelengths.

The measuring of the output level may include accumulating a signal output by the measurement pixel in an accumulation unit and measuring the output level based on a signal amount according to an accumulation time for which the signal is accumulated in the accumulation unit. The level adjustment parameter may be a coefficient according to a wavelength of the light detected by the measurement pixel. The level adjustment amount may be the accumulation time.

The measuring of the output level may include measuring an output level based on a signal obtained by an amplification unit amplifying a signal output by the measurement pixel. The level adjustment parameter may be a coefficient according to a wavelength of the light detected by the measurement pixel. The level adjustment amount may be a gain of the amplification unit.

The measuring of the output level may include accumulating a signal output by the measurement pixel in an accumulation unit, and measuring an output level based on a signal level obtained by an amplification unit amplifying a signal level based on a signal amount according to an accumulation time for which the signal is accumulated in the accumulation unit. The level adjustment parameter may be a coefficient according to a wavelength of the light detected by the measurement pixel. The level adjustment amount may be a set of the accumulation time and the gain of the amplification unit.

The type candidates of the plurality of samples may be classified depending on at least one of an extracted part of the target sample and a dyeing method for the target sample.

The first step may further include reading code information for specifying the target sample and selecting a type of the target sample specified by the code information.

The first step may further include searching for the type candidates of the plurality of samples stored in a memory and selecting the type of the target sample.

A color sensor may include: a part information input unit that selects a type of a target sample from a plurality of previously determined sample type candidates; a reference pixel on which light from the target sample is incident, the reference pixel generating a reference output signal; a first measurement unit that measures an output level of the output signal generated by the reference pixel; a measurement pixel on which the light from the target sample is incident, the measurement pixel generating an output signal corresponding to a spectrum of the target sample; a second measurement unit that measures spectral information of the target sample based on the output signal generated by the measurement pixel; a selection unit that selects a level adjustment parameter associated with the type of the target sample selected by the part information input unit from a plurality of level adjustment parameter candidates for adjusting an output level of the measurement pixel, the plurality of candidates being associated with the type of the target sample; and a calculation unit that calculates a level adjustment amount of the measurement pixel from the level adjustment parameter and the reference output level. The second measurement unit may adjust an output level of the output signal using the level adjustment amount calculated by the calculation unit when measuring the spectral information.

A virtual slide apparatus may include the color sensor.

According to the present invention, a type of a target sample is selected from a plurality of previously determined sample type candidates. Further, an output level of a reference pixel based on light from the target sample incident on the reference pixel is measured. Further, a level adjustment parameter associated with the type of the target sample for adjusting an output level of a measurement pixel is selected from a plurality of level adjustment parameter candidates associated with the type of the target sample. Further, a level adjustment amount of the measurement pixel is calculated from the selected level adjustment parameter and the output level of the reference pixel. The output level is adjusted using the calculated level adjustment amount when an output level corresponding to the light from the target sample incident on the measurement pixel is measured.

Thereby, it is possible to calculate an output level adjustment amount for adjusting the output level of the measurement pixel to be a valid level by measuring the output level of the reference pixel. Accordingly, it is possible to acquire spectral information of a target sample that is at a valid level and shorten a time taken to acquire the spectral information of the target sample, by performing two measurements: measurement of the output level of the reference pixel and measurement of the output level of the measurement pixel.

BRIEF DESCRIPTION OF THE DRAWINGS

The above features and advantages of the present invention will be more apparent from the following description of certain preferred embodiments taken in conjunction with the accompanying drawings, in which:

FIG. 2 is a schematic diagram of a slide glass having a barcode attached thereto in accordance with the first preferred embodiment of the present invention;

FIGS. 3A, 3B, and 3C are diagrams illustrating examples of pathological samples in accordance with the first preferred embodiment of the present invention;

FIG. 4 is a schematic diagram illustrating a data structure of an integration time coefficient table in accordance with the first preferred embodiment of the present invention;

FIG. 10 is a schematic diagram illustrating a data structure of a gain coefficient table in accordance with the second preferred embodiment of the present invention;

FIG. 13 is a schematic diagram illustrating a data structure of a gain and integration time coefficient table in accordance with the third preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
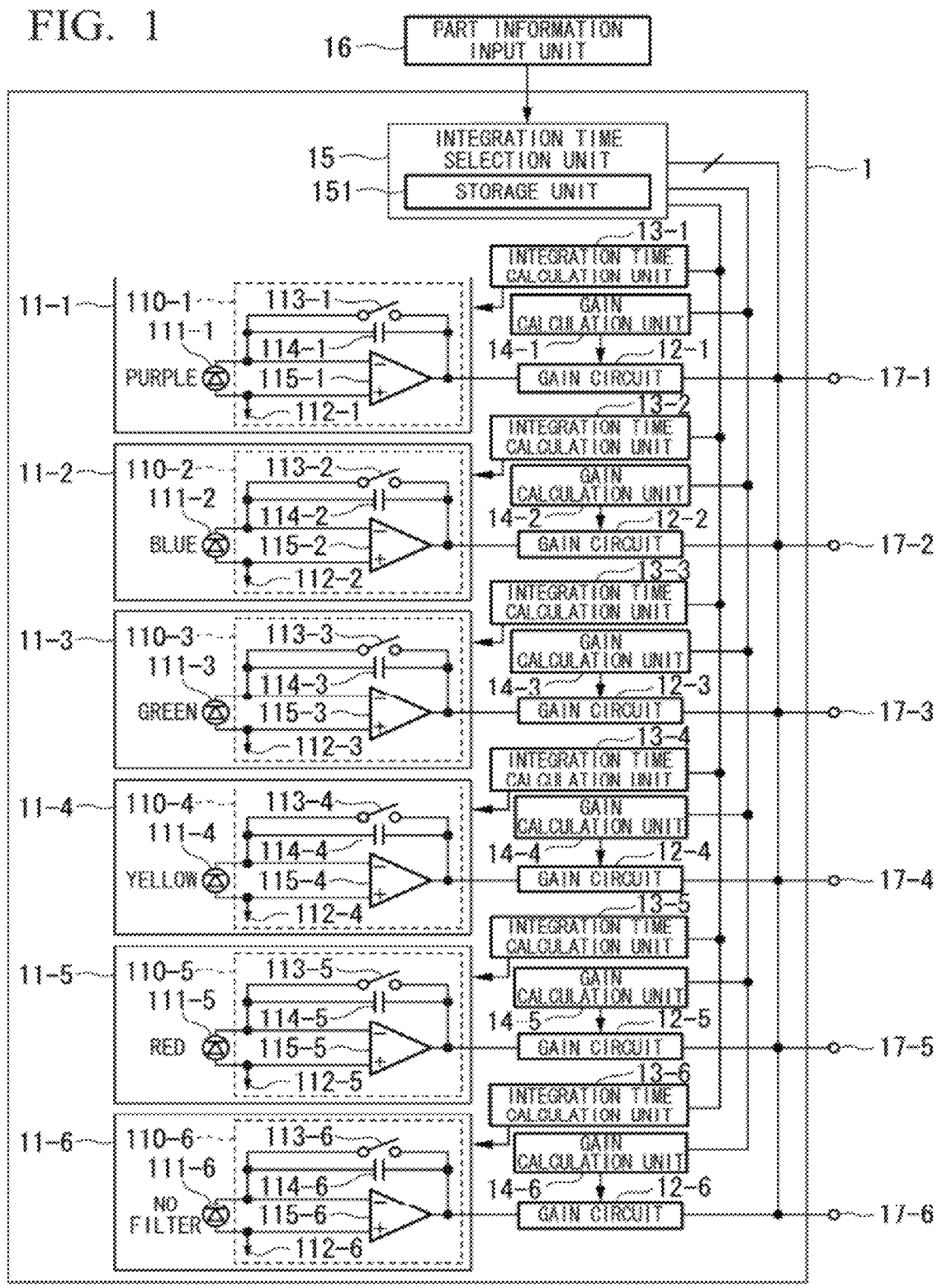
FIG. 1 is a schematic diagram illustrating a configuration of a color sensor in accordance with a first preferred embodiment of the present invention.

Hereinafter, a first preferred embodiment of the present invention will be described with reference to the accompanying drawings. FIG. 1 is a schematic diagram illustrating a configuration of a color sensor 1 in accordance with the first preferred embodiment of the present invention. In the shown example, the color sensor 1 includes pixel and reading circuits 11-1 to 11-6, gain circuits 12-1 to 12-6, integration time calculation units 13-1 to 13-6 (calculation units), gain calculation units 14-1 to 14-6, an integration time selection unit 15 (selection unit), and output terminals 17-1 to 17-6. Further, a part information input unit 16 is connected to the color sensor 1.

The pixel and reading circuits 11-1 to 11-5 include pixels 111-1 to 111-5 (measurement pixels) for detecting spectral information of a subject in respective divided wavelength transmission bands, reference voltage terminals 112-1 to 112-5, switch elements 113-1 to 113-5, capacitive elements 114-1 to 114-5 (accumulation units), and operational amplifiers 115-1 to 115-5. Further, the pixel and reading circuit 11-6 includes a pixel 111-6 (reference pixel) for detecting light from the subject, a reference voltage terminal 112-6, a switch element 113-6, a capacitive element 114-6, and an operational amplifier 115-6. Further, sections including the reference voltage terminals 112-1 to 112-6, the switch elements 113-1 to 113-6, the capacitive elements 114-1 to 114-6, and the operational amplifiers 115-1 to 115-6 are referred to as reading circuits 110-1 to 110-6. Further, a first measurement unit defined in the appended claims may correspond to, for example, the reading circuit 110-6 and the gain circuit 12-6. Further, a second measurement unit defined in the appended claims may correspond to, for example, the reading circuits 110-1 to 110-5 and the gain circuits 12-1 to 12-5.

Further, the pixel 111-1 included in the pixel and reading circuit 11-1 is a pixel coated with a filter for transmitting violet light to detect the violet light. Further, the pixel 111-2 included in the pixel and reading circuit 11-2 is a pixel coated with a filter for transmitting blue light to detect the blue light. Further, the pixel 111-3 included in the pixel and reading circuit 11-3 is a pixel coated with a filter for transmitting green light to detect the green light. Further, the pixel 111-4 included in the pixel and reading circuit 11-4 is a pixel coated with a filter for transmitting yellow light to detect the yellow light. Further, the pixel 111-5 included in the pixel and reading circuit 11-5 is a pixel coated with a filter for transmitting red light to detect the red light. Further, the pixel 111-6 included in the pixel and reading circuit 11-6 is a pixel having no filter coated thereon to detect all lights. This configuration enables the reading circuits 110-1 to 110-6 of the pixel and reading circuits 11-1 to 11-6 to read output signals of the pixels 111-1 to 111-6.

The gain circuits 12-1 to 12-6 amplify the output signals of the pixels 111-1 to 111-6 read by the pixel and reading circuits 11-1 to 11-5 based on gains calculated by the gain calculation units 14-1 to 14-6. The integration time calculation units 13-1 to 13-6 calculate integration times. The gain calculation units 14-1 to 14-6 calculate gains. The integration time selection unit 15 specifies a no-filter output coefficient. Further, the integration time selection unit 15 includes a storage unit 151 and specifies an integration time coefficient based on an integration time coefficient table stored in the storage unit 151. The storage unit 151 stores the integration time coefficient table. The integration time coefficient table will be described later. The output terminals 17-1 to 17-6 output signals amplified by the gain circuits 12-1 to 12-6.

The part information input unit 16 includes an input unit and receives part information (a type of a target sample) from a user. Further, the part information input unit 16 inputs the input part information to the integration time selection unit 15 of the color sensor 1. The part information is information indicating a part (e.g., lung, liver or mammary gland) of a pathological sample (target sample) whose spectral information is acquired by the color sensor 1. Alternatively, the part information input unit 16 includes a barcode reader in place of the input unit, and reads a barcode attached to a slide glass on which the pathological sample is placed, to receive the part information.

FIG. 2 is a schematic diagram of a slide glass having a barcode attached thereto in accordance with the first preferred embodiment of the present invention. In the shown example, a pathological sample 211 is placed on the slide glass 212. Further, the barcode 213 is attached to an upper left portion of the slide glass 212. The barcode 213 indicates the part information of the pathological sample placed on the slide glass 212. If the part information input unit 16 includes a barcode reader, the part information input unit 16 can read the barcode 213 attached to the slide glass 212 to receive the part information of the pathological sample 211.

FIGS. 3A, 3B, and 3C are diagrams illustrating examples of pathological samples in accordance with the first preferred embodiment of the present invention. FIG. 3A is a diagram showing a pathological sample "liver." FIG. 3B is a diagram showing a pathological sample "spleen." FIG. 3C is a diagram showing a pathological sample "lung." Since colors differ according to parts of the pathological sample, tendencies of the spectral information differ according to the pathological sample. For example, when an HE dyeing solution is used, the liver exhibits a pink color indicating an abundance of cytoplasm. Further, as shown, the spleen exhibits a purple color indicating an abundance of nuclei. Further, the lung exhibits white color indicating an abundance of something called emptiness in which there are no nuclei or cytoplasm.

Thus, the colors differ according to the parts of the pathological sample. Thereby, spectral information of a subject at a valid output level can be acquired by adjusting integration times when signals are read from the pixels 111-1 to 111-5 for detecting respective colored lights and gains of the read signals according to characteristics of the pathological sample so that a spectrum can be acquired according to colors of the pathological sample. Further, since tendencies of the spectral information of the pathological samples differ according to dyeing solutions, names of the dyeing solutions used for the pathological sample as well as the part information of the pathological sample may be contained in the part information.

Next, an operation procedure of the color sensor 1 will be described. In the color sensor 1, light from the pathological sample is incident on the pixels 111-1 to 111-6. The switch elements 113-1 to 113-6 control the integration times based on the reference voltages applied to the reference voltage terminals 112-1 to 112-6, and the capacitive elements 114-1 to 114-6 perform integration to obtain voltage changes according to photocurrent and output the voltage changes to the output terminals of the operational amplifiers 115-1 to 115-6. These outputs are voltage changes based on an amount of light incident on the pixels 111-1 to 111-5.

Further, in the color sensor 1, the gain circuits 12-1 to 12-6 amplify and read output changes of the output terminals of the operational amplifiers 115-1 to 115-6 while removing switching noise. Further, the output terminals of the gain circuits 12-1 to 12-6 are connected to the integration time selection unit 15, and output signals of the gain circuits 12-1 to 12-6 are input to the integration time selection unit 15.

In the first preferred embodiment, the integration time calculation units 13-1 to 13-5 calculate the integration times when the reading circuits 110-1 to 110-5 read the output signals of the pixels 111-1 to 111-5, based on the no-filter output coefficient and the integration time coefficient specified by the integration time selection unit 15. A method by which the integration time calculation units 13-1 to 13-5 calculate the integration times will be described later. In the first preferred embodiment, the integration time when the reading circuit 110-6 reads the output signal of the pixel 111-6 is constant. In the first preferred embodiment, the gains of the gain circuits 12-1 to 12-6 are constant. Thereby, output signals dependent on the integration times and the gains set by the integration time calculation units 13-1 to 13-6 and the gain calculation units 14-1 to 14-6 are output from the output terminals 17-1 to 17-6.

Next, the integration time coefficient table stored in the storage unit 151 will be described. FIG. 4 is a schematic diagram illustrating a data structure of the integration time coefficient table in accordance with the first preferred embodiment of the present invention. The integration time coefficient table has data items of "part," "pixel," and "integration time coefficient (level adjustment parameter)," and stores data of the data items to be associated with one another in each row.

The data item "part" stores the part information. The data item "pixel" stores types of lights detected by the pixels 111-1 to 111-5. The data item "integration time coefficient" stores an integration time coefficient for calculating an integration time in which an output level is equal to or higher than a noise level and equal to or lower than a saturation level when a light spectrum is acquired by the pixels 111-1 to 111-5 for detecting lights stored in the data item "pixel" in the same row for a pathological sample specified by the part information stored in the data item "part" in the same row.

In the shown example, a value stored in the data item "part" in the row 101 is "liver," a value stored in the data item "pixel" in the row 101 is "purple," and a value stored in the data item "integration time coefficient" in the row 101 is "3.2." This shows that an integration time coefficient when the pixel 111-1 for detecting violet light acquires a spectrum of the pathological sample of the liver is "3.2." Further, for other rows, the values are as shown.

Next, a method by which the integration time calculation units 13-1 to 13-5 calculate the integration time (level adjustment amount or accumulation time) will be described. A method of calculating the integration time includes a method of calculating the integration time using the following equation.

(integration time)=(no-filter output coefficient)×(integration time coefficient)×(basic integration time)

Further, the no-filter output coefficient is a coefficient for correcting the output value of the pixel 111-6 having no filter coated thereon to be equal to or higher than a noise level and equal to or lower than a saturation level. The integration time selection unit 15 calculates the no-filter output coefficient based on the output value of the pixel 111-6. In the first preferred embodiment, the no-filter output coefficient is a coefficient for correcting the output value of the pixel 111-6 having no filter coated thereon to have the same value as the saturation level. For example, if the saturation level is "100" and the output value of the pixel 111-6 is "200," the no-filter output coefficient calculated by the integration time selection unit 15 is "0.5." Further, in the first preferred embodiment, the basic integration time is "1.00E-04 (s)."

Using the above-described equation, the integration time calculation units 13-1 to 13-5 calculate the integration time. Further, the reading circuits 110-1 to 110-5 read the output signals of the pixels 111-1 to 111-5 in the integration times calculated by the integration time calculation units 13-1 to 13-5. Further, the gain circuits 12-1 to 12-5 amplify the output signals of the pixels 111-1 to 111-5 read by the reading circuits 110-1 to 110-5 based on the given gain and cause the resultant signals to be output from the output terminals 17-1 to 17-5. Thereby, the color sensor 1 can acquire the spectral information of the pathological sample equal to or lower than the saturation level and equal to or higher than the noise level.

Figure 5:
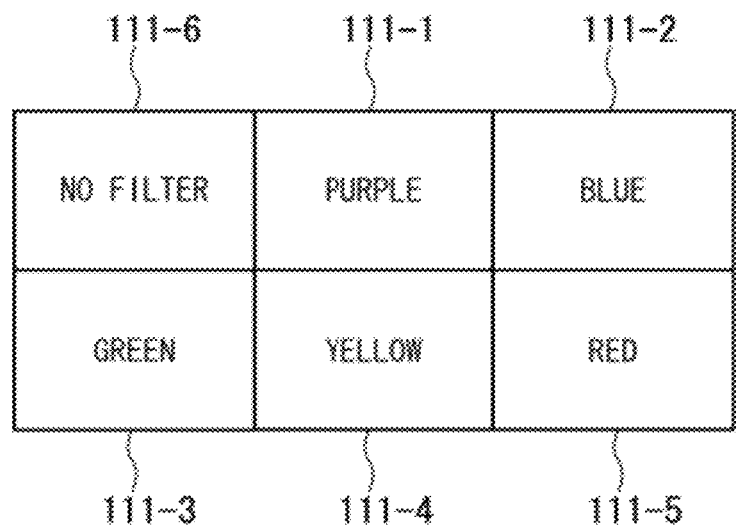
FIG. 5 is a schematic diagram illustrating an arrangement of the pixels included in the color sensor in accordance with the first preferred embodiment of the present invention.

Next, an arrangement of the pixels 111-1 to 111-6 included in the color sensor 1 will be described. FIG. 5 is a schematic diagram illustrating an arrangement of the pixels 111-1 to 111-6 included in the color sensor 1 in accordance with the first preferred embodiment of the present invention. In the shown example, the pixel 111-6 that does not have a filter coated thereon is arranged to the upper left to detect all lights. The pixel 111-1 coated with a filter transmitting violet light is also arranged to the upper center to detect the violet light. Further, the pixel 111-2 coated with a filter transmitting blue light is arranged to the upper right to detect the blue light. The pixel 111-3 coated with a filter transmitting green light is also arranged to the lower left to detect the green light. The pixel 111-4 coated with a filter transmitting yellow light is also arranged to the lower center to detect the yellow light. The pixel 111-5 coated with a filter transmitting red light is also arranged to the lower right to detect the red light. Further, the arrangement of the pixels 111-1 to 111-6 is not limited to the shown arrangement and may be any arrangement.

Figure 6:
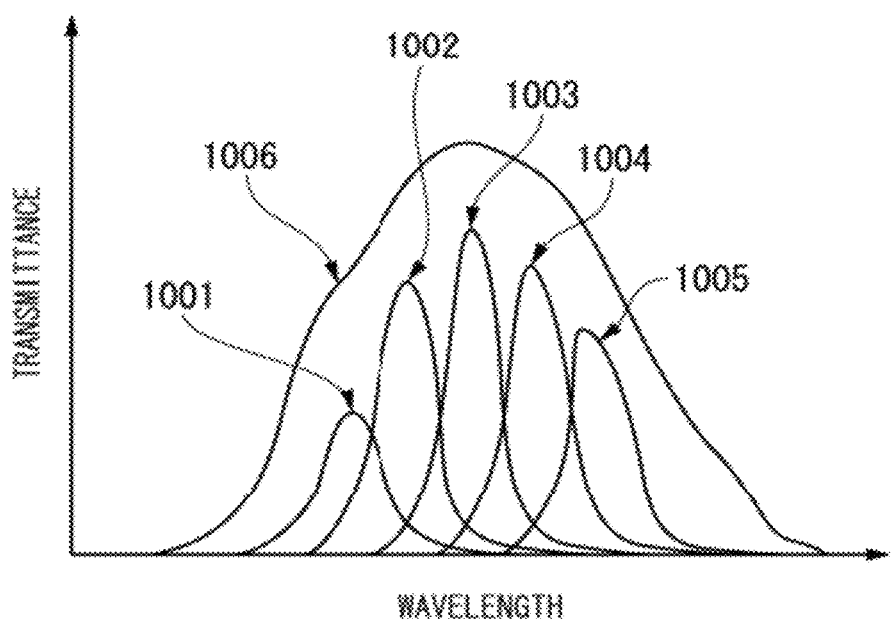
FIG. 6 is a graph illustrating spectral characteristics of the pixels in accordance with the first preferred embodiment of the present invention.

Next, the spectral characteristics of the pixels 111-1 to 111-6 will be described. FIG. 6 is a graph illustrating spectral characteristics of the pixels 111-1 to 111-6 in accordance with the first preferred embodiment of the present invention. The shown graph shows a curve 1001 indicating transmittance of the filter coated on the pixel 111-1 for detecting violet light, a curve 1002 indicating transmittance of the filter coated on the pixel 111-2 for detecting blue light, a curve 1003 indicating transmittance of the filter coated on the pixel 111-3 for detecting green light, a curve 1004 indicating transmittance of the filter coated on the pixel 111-4 for detecting yellow light, a curve 1005 indicating transmittance of the filter coated on the pixel 111-5 for detecting red light, and a curve 1006 indicating transmittance of light when a filter is not coated. Thus, wavelengths of light transmitted by the respective color filters differ. Further, the transmittance of the light when the filter has not been coated is higher than the transmittance when the filter has been coated, over all wavelength bands. Thereby, the output of the pixel 111-6 having no filter coated thereon exhibits the highest output change in comparison with outputs of the pixels 111-1 to 111-5 on which filters are coated, for any incident wavelength.

Figure 7:
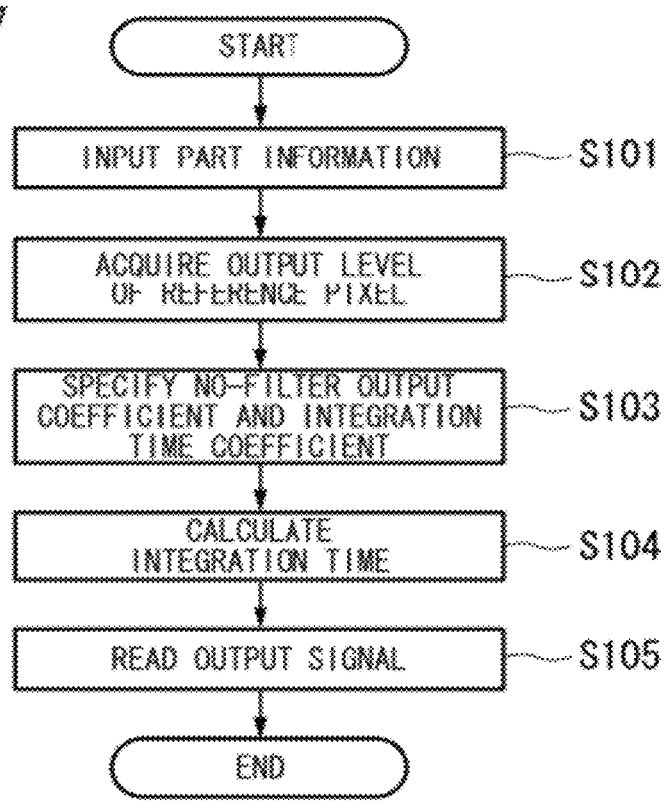
FIG. 7 is a flowchart illustrating an adjustment procedure for output levels of the color sensor in accordance with the first preferred embodiment of the present invention.

Next, an adjustment procedure for the output level of the color sensor 1 in the first preferred embodiment will be described. FIG. 7 is a flowchart illustrating an adjustment procedure for output levels of the color sensor 1 in accordance with the first preferred embodiment of the present invention.
(Step S101)

If acquisition of the spectral information of the pathological sample starts, a user inputs part information to the part information input unit 16. The part information input unit 16 receives the part information input by the user. Then, the process proceeds to step S102.
(Step S102)

The first read-out is performed and the integration time selection unit 15 acquires an output level based on the output of the pixel 111-6 for detecting all colored lights, which is output by the gain circuit 12-6. Hereinafter, the output level of the gain circuit 12-6 is described as an output level of a reference pixel. Then, the process proceeds to step S103.
(Step S103)

The integration time selection unit 15 specifies the no-filter output coefficient based on the output level of the reference pixel acquired in step S102. Further, the integration time selection unit 15 selects the integration time coefficient specified by the part information received by the part information input unit 16 in step S101 from the integration time coefficient table stored in the storage unit 151, for each of the pixels 111-1 to 111-5. Then, the process proceeds to step S104.
(Step S104)

The integration time calculation units 13-1 to 13-5 calculate integration times when the reading circuits 110-1 to 110-5 read the output of the pixels 111-1 to 111-5 based on the no-filter output coefficient and the integration time coefficient specified by the integration time selection unit 15 in step S103. Then, the process proceeds to step S105.
(Step S105)

A second read-out is performed and the reading circuits 110-1 to 110-5 read output signals of the pixels 111-1 to 111-5 based on the integration times calculated in step S104. Further, the gain circuits 12-1 to 12-5 amplify the output signals read by the reading circuits 110-1 to 110-5 according to a previously determined gain and cause the resultant signals to be output from the output terminals 17-1 to 17-5. Then, the process ends.

As described above, according to the first preferred embodiment, in the first read-out, an output level based on the output of the pixel 111-6 having no filter coated thereon is read. The integration time selection unit 15 specifies the no-filter output coefficient based on the output level based on the output of the pixel 111-6 acquired in the first read-out. Further, the integration time selection unit 15 specifies the integration time coefficient based on the part information received by the part information input unit 16 and the integration time coefficient table stored in the storage unit 151. Further, the integration time calculation units 13-1 to 13-5 calculate integration times when the reading circuits 110-1 to 110-5 read the output of the pixels 111-1 to 111-5 based on the no-filter output coefficient and the integration time coefficient so that the output signals of the pixels 111-1 to 111-5 are equal to or higher than a noise level and equal to or lower than a saturation level.

In the second read-out, the reading circuits 110-1 to 110-5 read the output signals of the pixels 111-1 to 111-5 based on the integration times calculated by the integration time calculation units 13-1 to 13-5. Further, the gain circuits 12-1 to 12-5 amplify the output signals of the pixels 111-1 to 111-5 read by the reading circuits 110-1 to 110-5 based on the given gain, and cause the resultant signals to be output from the output terminals 17-1 to 17-5.

Figure 8:
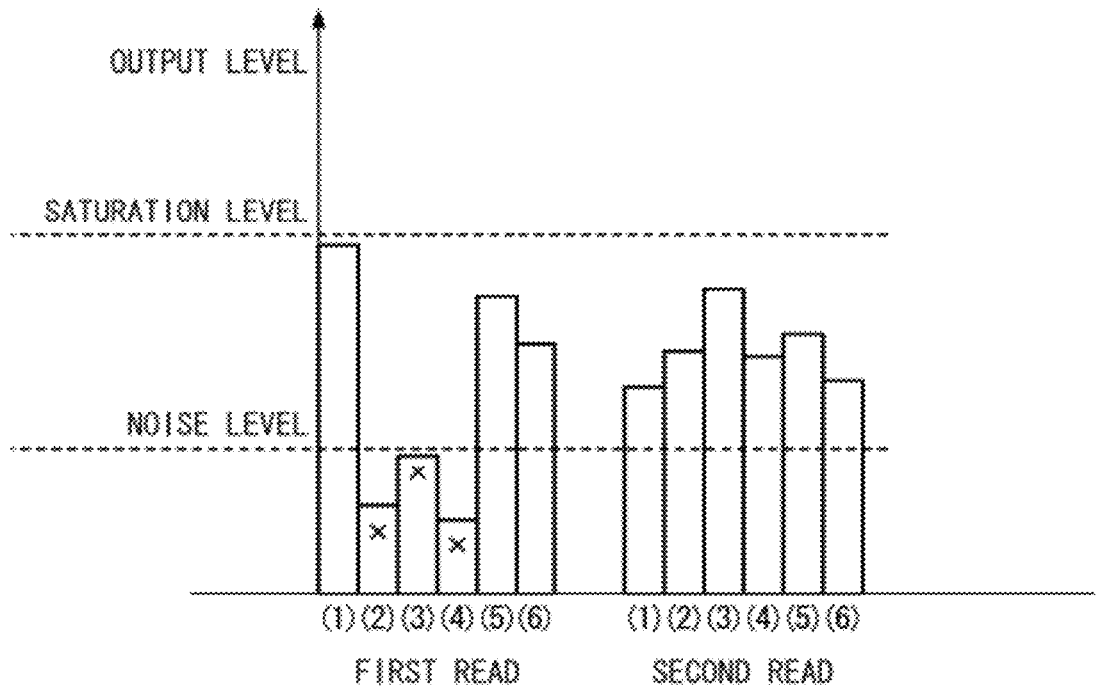
FIG. 8 is a graph illustrating an example of output levels of signals output from the color sensor in accordance with the first preferred embodiment of the present invention.

FIG. 8 is a graph illustrating an example of output levels output from the output terminals 17-1 to 17-6 when the output signals of the pixels 111-1 to 111-6 are read using the above-described method. A vertical axis of the shown graph indicates output levels of the signals based on the output signals of the pixels 111-1 to 111-6, which are output from the output terminals 17-1 to 17-6. If the output level of the signal is equal to or higher than a noise level and equal to or lower than a saturation level, the signal may be used when the spectral information is acquired. Further, a horizontal axis of the shown graph indicates the output terminals 17-1 to 17-6 that output the signals based on the output signals of the pixels 111-1 to 111-6 in the first and second read-outs.

Specifically, (1) on a horizontal axis indicates the output terminal 17-1 that outputs a signal based on the output signal of the pixel 111-1 for detecting violet light in the first and second read-outs, and a value on the vertical axis corresponding to the horizontal axis (1) indicates an output level of the signal output from the output terminal 17-1. Further, (2) on the horizontal axis indicates the output terminal 17-2 that outputs a signal based on the output signal of the pixel 111-2 for detecting blue light in the first and second read-outs, and a value on the vertical axis corresponding to the horizontal axis (2) indicates an output level of the signal output from the output terminal 17-2. Further, (3) on the horizontal axis indicates the output terminal 17-3 that outputs a signal based on the output signal of the pixel 111-3 for detecting green light in the first and second read-outs, and a value on the vertical axis corresponding to the horizontal axis (3) indicates an output level of the signal output from the output terminal 17-3. Further, (4) on the horizontal axis indicates the output terminal 17-4 that outputs a signal based on the output signal of the pixel 111-4 for detecting yellow light in the first and second read-outs, and a value on the vertical axis corresponding to the horizontal axis (4) indicates an output level of the signal output from the output terminal 17-4. Further, (5) on the horizontal axis indicates the output terminal 17-5 that outputs a signal based on the output signal of the pixel 111-5 for detecting red light in the first and second read-outs, and a value on the vertical axis corresponding to the horizontal axis (5) indicates an output level of the signal output from the output terminal 17-5. Further, (6) on the horizontal axis indicates the output terminal 17-6 that outputs a signal based on the output signal of the pixel 111-6 having no filter coated thereon in the first and second read-outs, and a value on the vertical axis corresponding to the horizontal axis (6) indicates an output level of the signal output from the output terminal 17-6.

In the shown example, in the first read-out, an output level of the signal based on the output signal of the pixel 111-2 for detecting blue color, which is output from the output terminal 17-2, an output level of the signal based on the output signal of the pixel 111-3 for detecting green color, which is output from the output terminal 17-3, and an output level of the signal based on the output signal of the pixel 111-4 for detecting yellow color, which is output from the output terminal 17-4, are invalid output levels that are equal to or less than the noise level. Further, in the second read-out, the output levels of the signals based on the output signals of the pixels 111-1 to 111-5 output from the output terminals 17-1 to 17-5 are all equal to or higher than the noise level and equal to or lower than the saturation level.

Thus, in the first read-out, the integration time selection unit 15 of the color sensor 1 acquires the signal based on the output signal of the pixel 111-6 having no filter coated thereon and calculates the no-filter output coefficient based on this signal. Further, the integration time selection unit 15 specifies the integration time coefficient based on the part information input to the part information input unit 16. Further, the integration time calculation units 13-1 to 13-5 calculate integration times in which the output signals of the pixels 111-1 to 111-5 are equal to or higher than the noise level and equal to or lower than the saturation level, using the no-filter output coefficient and the integration time coefficient.

In the second read-out, the reading circuits 110-1 to 110-5 of the color sensor 1 read the output signals of the pixels 111-1 to 111-5 based on the integration times calculated by the integration time calculation units 13-1 to 13-5. Further, the gain circuits 12-1 to 12-5 amplify the output signals of the pixels 111-1 to 111-5 read by the reading circuits 110-1 to 110-5 based on a given gain and cause the resultant signals to be output from the output terminals 17-1 to 17-5. The output levels output from the output terminals 17-1 to 17-5 are spectral information of the pathological sample. Accordingly, the color sensor 1 can acquire the spectral information of the pathological sample at a valid output level and shorten a time necessary to acquire the spectral information of the pathological sample that is at a valid output level by performing only two read-outs.

Second Preferred Embodiment

Figure 9:
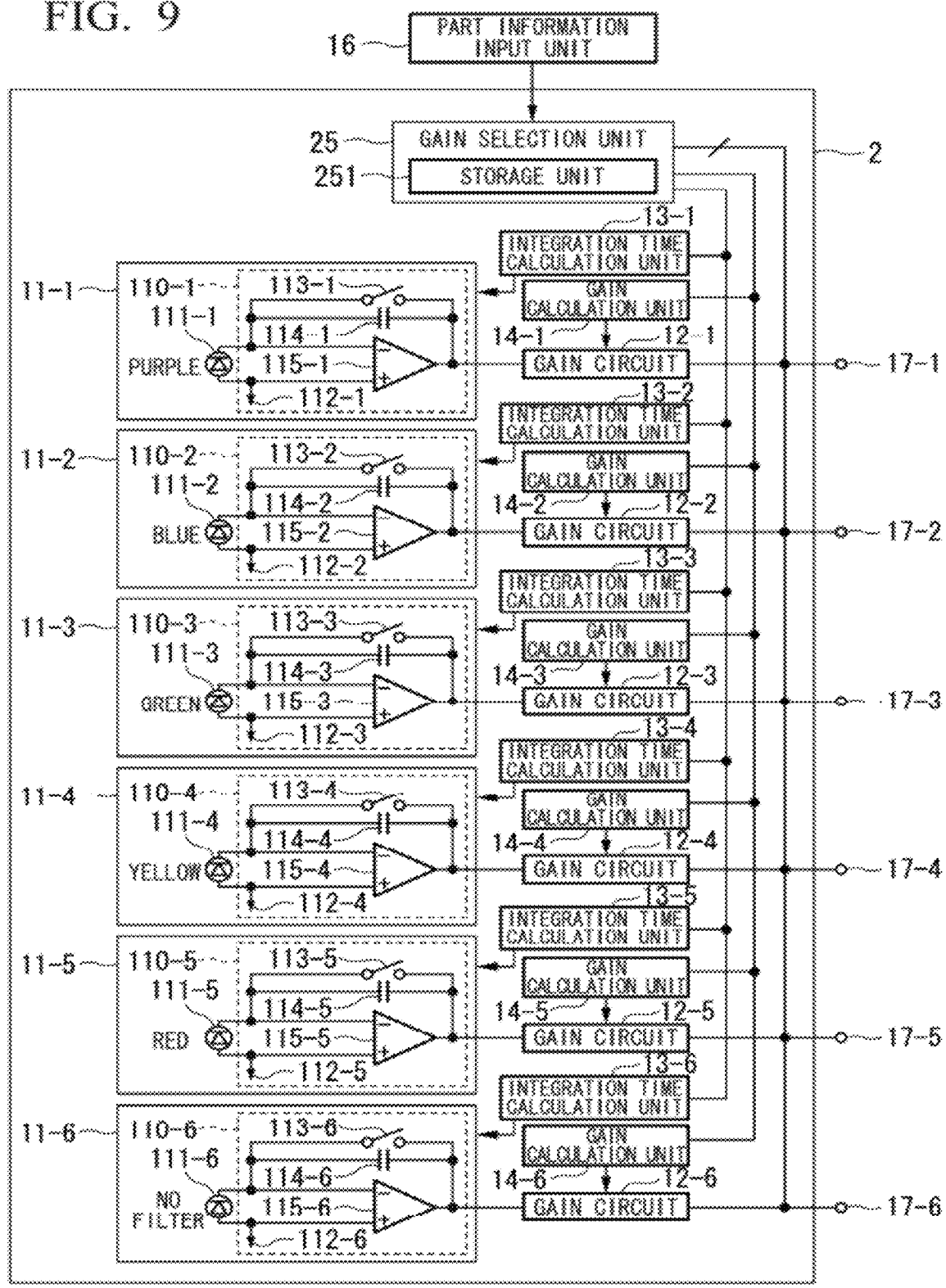
FIG. 9 is a schematic diagram illustrating a configuration of a color sensor in accordance with a second preferred embodiment of the present invention.

Next, a second preferred embodiment of the present invention will be described with reference to the accompanying drawings. FIG. 9 is a schematic diagram illustrating a configuration of a color sensor 2 in accordance with the second preferred embodiment of the present invention. In the shown example, the color sensor 2 includes pixel and reading circuits 11-1 to 11-6, gain circuits 12-1 to 12-6 (amplification units), integration time calculation units 13-1 to 13-6, gain calculation units 14-1 to 14-6 (calculation units), a gain selection unit 25 (selection unit), and output terminals 17-1 to 17-6. Further, a part information input unit 16 is connected to the color sensor 2.

The pixel and reading circuits 11-1 to 11-6, the gain circuits 12-1 to 12-6, the integration time calculation units 13-1 to 13-6, the gain calculation units 14-1 to 14-6, the part information input unit 16, and the output terminals 17-1 to 17-6 have the same configurations as the respective units in the first preferred embodiment. Further, an arrangement of the pixels 111-1 to 111-6 included in the pixel and reading circuits 11-1 to 11-6 of the color sensor 2 is the same as that of the pixels 111-1 to 111-6 in the first preferred embodiment. Further, spectral characteristics of the pixels 111-1 to 111-6 are the same as those of the pixels 111-1 to 111-6 in the first preferred embodiment. The gain selection unit 25 specifies a no-filter output coefficient. Further, the gain selection unit 25 includes a storage unit 251, and specifies a gain coefficient based on a gain coefficient table stored in the storage unit 251. The storage unit 251 stores the gain coefficient table. The gain coefficient table will be described later.

In the second preferred embodiment, the gain calculation units 14-1 to 14-5 calculate gains of the gain circuits 12-1 to 12-5 based on the no-filter output coefficient and the gain coefficient specified by the gain selection unit 25. A method by which the gain calculation units 14-1 to 14-5 calculate the gains will be described later. In the second preferred embodiment, the gain of the gain circuit 12-6 is constant. Further, in the second preferred embodiment, integration times when the reading circuits 110-1 to 110-5 read output signals of the pixels 111-1 to 111-5 are constant. Thereby, output signals according to the integration times and the gains set by the integration time calculation units 13-1 to 13-6 and the gain calculation units 14-1 to 14-6 are output from the output terminals 17-1 to 17-6.

Next, the gain coefficient table stored in the storage unit 251 will be described. FIG. 10 is a schematic diagram illustrating a data structure of the gain coefficient table in accordance with the second preferred embodiment of the present invention. The gain coefficient table has data items "part," "pixel," "gain coefficient (level adjustment parameter)," and stores data of the respective data items to be associated with one another in each row.

The data items "part" and "pixel" are the same as those of the integration time coefficient table in the first preferred embodiment. The data item "gain coefficient" stores a gain coefficient for calculating a gain with which an output level is equal to or higher than a noise level and equal to or lower than a saturation level when the pixels 111-1 to 111-5 for detecting the light stored in the data item "pixel" in the same row acquires light spectra for a pathological sample specified by the part information stored in the data item "part" in the same row.

In the shown example, a value stored in the data item "part" in the row 207 is "lung," a value stored in the data item "pixel" in the row 207 is "purple," and a value stored in the data item "gain coefficient" in the row 207 is "1.5." This shows that a gain coefficient when the pixel 111-1 for detecting violet light acquires a spectrum of a pathological sample of the lung is "1.5." Further, for other rows, the values are as shown.

Next, the method by which the gain calculation units 14-1 to 14-5 calculate the gains (level adjustment amounts) will be described. The gain calculation method includes a method of calculating the gains using the following equation.

(gain)=(no-filter output coefficient)×(gain coefficient)×(basic gain)

The no-filter output coefficient is the same as the no-filter coefficient in the calculation equation for an integration time in the first preferred embodiment. Further, in the second preferred embodiment, the basic gain is "1.0."

Using the above-described equation, the gain calculation units 14-1 to 14-5 calculate gains. Further, the reading circuits 110-1 to 110-5 read the output signals of the pixels 111-1 to 111-5 in given integration times. Further, the gain circuits 12-1 to 12-5 amplify the output signals of the pixels 111-1 to 111-5 read by the reading circuits 110-1 to 110-5 based on the gains calculated by the gain calculation units 14-1 to 14-5 and cause the resultant signals to be output from the output terminals 17-1 to 17-5. Thereby, the color sensor 2 can acquire spectral information of a pathological sample equal to or lower than the saturation level and equal to or higher than the noise level.

Figure 11:
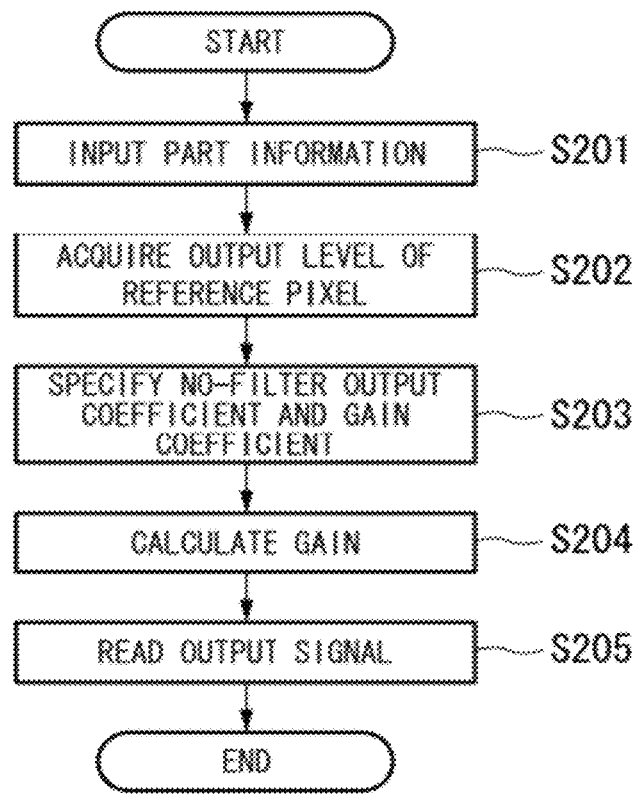
FIG. 11 is a flowchart illustrating the adjustment procedure for the output level of the color sensor in accordance with the second preferred embodiment of the present invention.

Next, an adjustment procedure for the output level of the color sensor 2 in accordance with the second preferred embodiment will be described. FIG. 11 is a flowchart illustrating the adjustment procedure for the output level of the color sensor 2 in accordance with the second preferred embodiment of the present invention. A process of step S201 is the same as that of step S101 shown in FIG. 7 in the first preferred embodiment.

(Step S202)

The first read-out is performed and the gain selection unit 25 acquires an output level based on the output of the pixel 111-6 for detecting all colored lights, which is output by the gain circuit 12-6. Then, the process proceeds to step S203.

(Step S203)

The gain selection unit 25 specifies a no-filter output coefficient based on the output level of the reference pixel acquired in step S202. Further, the gain selection unit 25 selects the gain coefficient specified by the part information received by the part information input unit 16 in step S201 from the gain coefficient table stored in the storage unit 251, for each of the pixels 111-1 to 111-5. Then, the process proceeds to step S204.

(Step S204)

The gain calculation units 14-1 to 14-5 calculate the respective gains of the gain circuits 12-1 to 12-5 based on the no-filter output coefficient and the gain coefficient specified by the gain selection unit 15 in step S203. Then, the process proceeds to step S205.

(Step S205)

A second read-out is performed and the reading circuits 110-1 to 110-5 read the output signals of the pixels 111-1 to 111-5 based on previously determined integration times. Further, the gain circuits 12-1 to 12-5 amplify the output signals read by the reading circuits 110-1 to 110-5 based on the gains calculated by the gain calculation units 14-1 to 14-5 in step S204, and cause the resultant signals to be output from the output terminals 17-1 to 17-5. Then, the process ends.

As described above, according to the second preferred embodiment, in the first read-out, the gain selection unit 25 of the color sensor 2 acquires the signal based on the output signal of the pixel 111-6 having no filter coated thereon, and calculates the no-filter output coefficient based on this signal. Further, the gain selection unit 25 specifies the gain coefficient based on the part information input to the part information input unit 16. Further, the gain calculation units 14-1 to 14-5 calculate gains with which the output signals of the pixels 111-1 to 111-5 are equal to or higher than a noise level and equal to or lower than a saturation level, using the no-filter output coefficient and the gain coefficient.

In the second read-out, the reading circuits 110-1 to 110-5 of the color sensor 2 read the output signals of the pixels 111-1 to 111-5 in given integration times. Further, the gain circuits 12-1 to 12-5 amplifies the output signals of the pixels 111-1 to 111-5 read by the reading circuits 110-1 to 110-5 based on the gains calculated by the gain calculation units 14-1 to 14-5 and cause the resultant signals to be output from the output terminals 17-1 to 17-5. The output levels output from the output terminals 17-1 to 17-5 are the spectral information of the pathological sample. Accordingly, the color sensor 2 can acquire the spectral information of the pathological sample at a valid output level and shorten the time necessary to acquire the spectral information of the pathological sample that is at a valid output level by performing only two read-outs.

Third Preferred Embodiment

Figure 12:
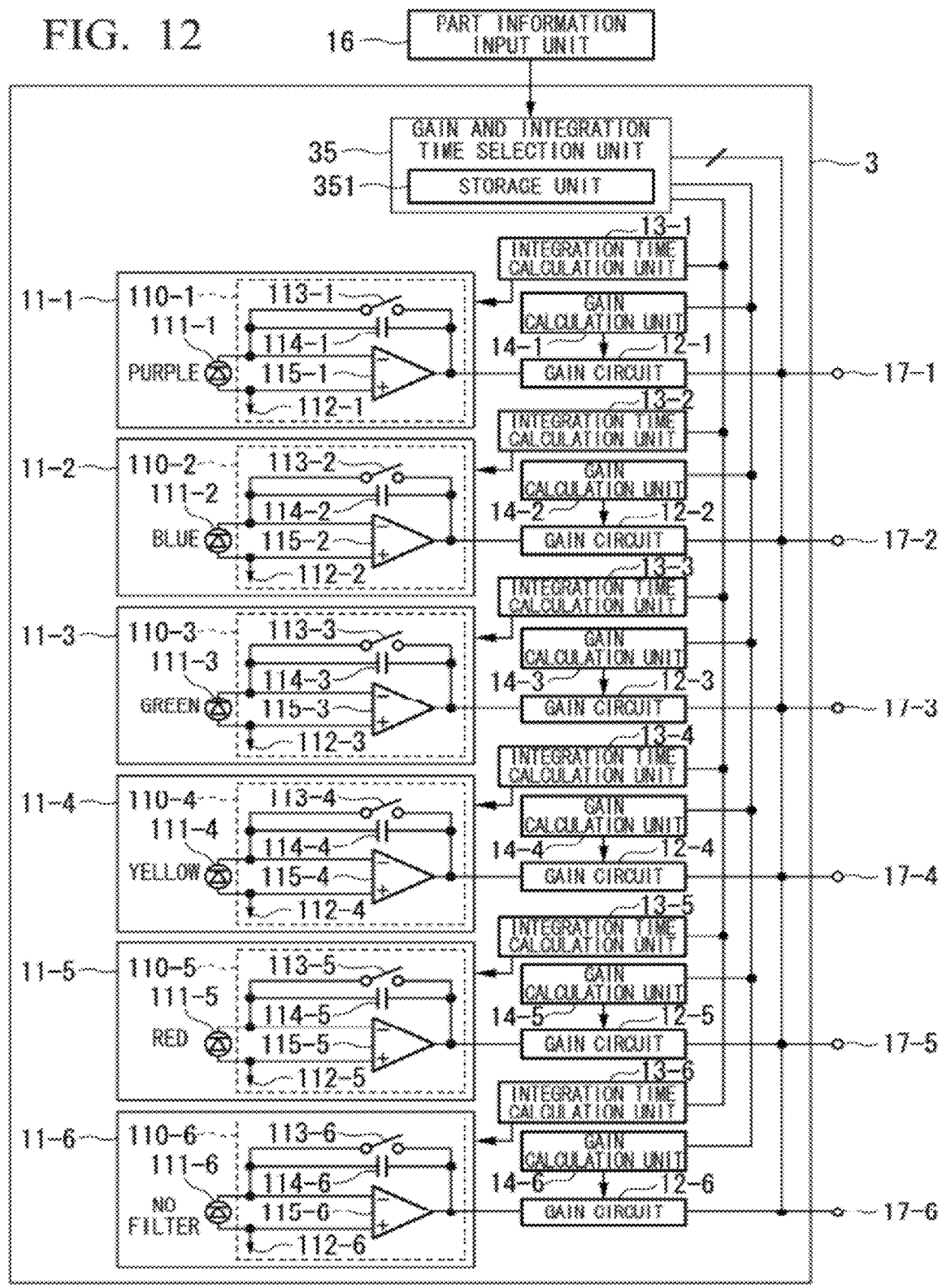
FIG. 12 is a schematic diagram illustrating a configuration of a color sensor in accordance with a third preferred embodiment of the present invention.

Next, a third preferred embodiment of the present invention will be described with reference to the accompanying drawings. FIG. 12 is a schematic diagram illustrating a configuration of a color sensor 3 in accordance with the third preferred embodiment of the present invention. In the shown example, the color sensor 3 includes pixel and reading circuits 11-1 to 11-6, gain circuits 12-1 to 12-6, integration time calculation units 13-1 to 13-6 (calculation units), gain calculation units 14-1 to 14-6 (calculation units), a gain and integration time selection unit 35 (selection unit), and output terminals 17-1 to 17-6. Further, a part information input unit 16 is connected to the color sensor 3.

The pixel and reading circuits 11-1 to 11-6, the gain circuits 12-1 to 12-6, the integration time calculation units 13-1 to 13-6, the gain calculation units 14-1 to 14-6, the part information input unit 16, and the output terminals 17-1 to 17-6 have the same configurations as in the first preferred embodiment. Further, an arrangement of the pixels 111-1 to 111-6 included in the pixel and reading circuits 11-1 to 11-6 of the color sensor 3 is the same as that of the pixels 111-1 to 111-6 in the first preferred embodiment. Further, spectral characteristics of the pixels 111-1 to 111-6 are the same as those of the pixels 111-1 to 111-6 in the first preferred embodiment. The gain and integration time selection unit 35 specifies a no-filter output coefficient. Further, the gain and integration time selection unit 35 includes a storage unit 351 and specifies a gain coefficient and an integration time coefficient based on a gain and integration time coefficient table stored in the storage unit 351. The storage unit 351 stores the gain and integration time coefficient table. The gain and integration time coefficient table will be described later.

In the third preferred embodiment, the integration time calculation units 13-1 to 13-5 calculate integration times when the reading circuits 110-1 to 110-5 read output signals of the pixels 111-1 to 111-5 based on the no-filter output coefficient and the integration time coefficient specified by the gain and integration time selection unit 35. Further, in the third preferred embodiment, an integration time when the reading circuit 110-6 reads an output signal of the pixel 111-6 is constant. Further, in the third preferred embodiment, the gain calculation units 14-1 to 14-5 calculate gains of the gain circuits 12-1 to 12-5 based on the no-filter output coefficient and the gain coefficient specified by the gain and integration time selection unit 35. Further, in the third preferred embodiment, the gain of the gain circuit 12-6 is constant. Thereby, output signals according to the integration times and the gains set by the integration time calculation units 13-1 to 13-6 and the gain calculation units 14-1 to 14-6 are output from the output terminals 17-1 to 17-6.

Next, the gain and integration time coefficient table stored in the storage unit 351 will be described. FIG. 13 is a schematic diagram illustrating a data structure of the gain and integration time coefficient table in accordance with the third preferred embodiment of the present invention. The gain and integration time coefficient table has data items "part," "pixel," "gain coefficient," and "integration time coefficient," and stores data of the respective data items to be associated with one another in each row.

The data items "part," "pixel," and "integration time coefficient" are the same as those of the integration time coefficient table in the first preferred embodiment. Further, the data item "gain coefficient" is the same as that of the gain coefficient table in the second preferred embodiment.

In the shown example, a value stored in the data item "part" in the row 313 is "spleen," a value stored in the data item "pixel" in the row 313 is "purple," and a value stored in the data item "gain coefficient" in the row 313 is "1.5," and a value stored in the data item "integration time coefficient" in the row 313 is "3.2." This shows that a gain coefficient when the pixel 111-1 for detecting violet light acquires a spectrum of a pathological sample of the spleen is "1.5," and the integration time coefficient is "3.2." Further, for other rows, the values are as shown.

Next, a method by which the integration time calculation units 13-1 to 13-5 calculate integration times and a method by which the gain calculation units 14-1 to 14-5 calculate gains will be described. The method of calculating an integration time is the same as in the first preferred embodiment. Further, the gain calculation method is the same as in the second preferred embodiment.

Using the above-described method, the gain calculation units 14-1 to 14-5 calculate gains. Further, using the above-described method, the integration time calculation units 13-1 to 13-5 calculate integration times. Further, the reading circuits 110-1 to 110-5 read output signals of the pixels 111-1 to 111-5 in the integration times calculated by the integration time calculation units 13-1 to 13-5. Further, the gain circuits 12-1 to 12-5 amplify the output signals of the pixels 111-1 to 111-5 read by the reading circuits 110-1 to 110-5 based on the gains calculated by the gain calculation units 14-1 to 14-5 and cause the resultant signals to be output from the output terminals 17-1 to 17-5. Thereby, the color sensor 3 can acquire the spectral information of the pathological sample equal to or lower than the saturation level and equal to or higher than the noise level.

Figure 14:
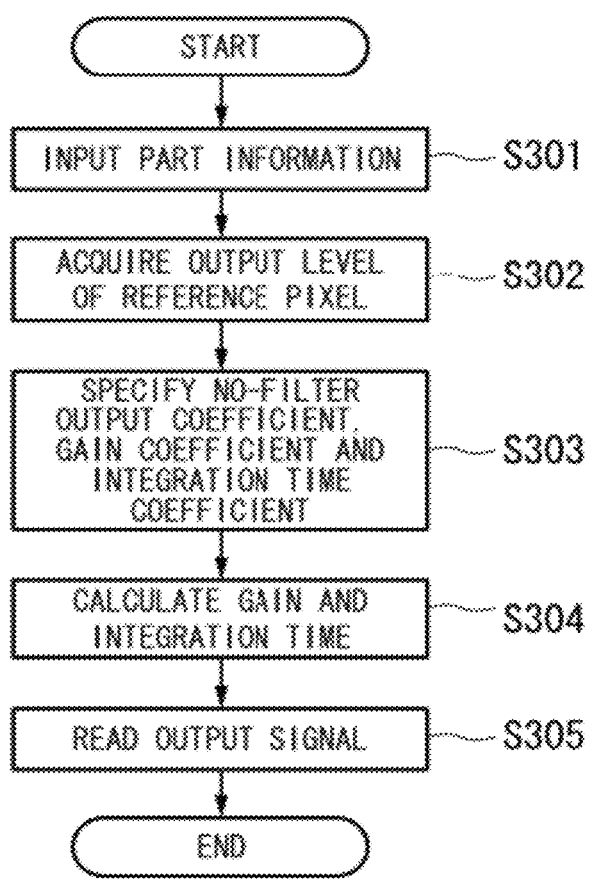
FIG. 14 is a flowchart illustrating an adjustment procedure for the output level of the color sensor in accordance with the third preferred embodiment of the present invention.

Next, an adjustment procedure for the output level of the color sensor 3 in the third preferred embodiment will be described. FIG. 14 is a flowchart illustrating an adjustment procedure for the output level of the color sensor 3 in accordance with the third preferred embodiment of the present invention. A process of step S301 is the same as that of step S101 shown in FIG. 7 in the first preferred embodiment.
(Step S302)

The first read-out is performed and the gain and integration time selection unit 35 acquires an output level based on the output of the pixel 111-6 for detecting all colored lights, which is output by the gain circuit 12-6. Then, the process proceeds to step S303.
(Step S303)

The gain and integration time selection unit 35 specifies a no-filter output coefficient based on the output level of the reference pixel acquired in step S302. Further, the gain and integration time selection unit 35 selects the gain coefficient and the integration time coefficient specified by the part information received by the part information input unit 16 in step S301 from the gain and integration time coefficient table stored in the storage unit 351, for each of the pixels 111-1 to 111-5. Then, the process proceeds to step S304.
(Step S304)

The gain calculation units 14-1 to 14-5 calculate the respective gains of the gain circuits 12-1 to 12-5 based on the no-filter output coefficient and the gain coefficient specified by the gain and integration time selection unit 35 in step S303. Further, the integration time calculation units 13-1 to 13-5 calculate integration times when the reading circuits 110-1 to 110-5 read the outputs of the pixels 111-1 to 111-5, based on the no-filter output coefficient and the integration time coefficient specified by the gain and integration time selection unit 35 in step S303. Then, the process proceeds to step S305.
(Step S305)

A second read-out is performed and the reading circuits 110-1 to 110-5 read output signals of the pixels 111-1 to 111-5 based on the integration times calculated by the integration time calculation units 13-1 to 13-5 in step S304. Further, the gain circuits 12-1 to 12-5 amplify the output signals read by the reading circuits 110-1 to 110-5 based on the gains calculated by the gain calculation units 14-1 to 14-5 in step S304, and cause the resultant signals to be output from the output terminals 17-1 to 17-5. Then, the process ends.

As described above, according to the third preferred embodiment, in the first read-out, the gain and integration time selection unit 35 of the color sensor 3 acquires the signal based on the output signal of the pixel 111-6 having no filter coated thereon, and calculates the no-filter output coefficient based on this signal. Further, the gain and integration time selection unit 35 specifies the gain coefficient and the integration time coefficient based on the part information input to the part information input unit 16. Further, the integration time calculation units 13-1 to 13-5 calculate integration times in which the output signals of the pixels 111-1 to 111-5 are equal to or higher than a noise level and equal to or lower than a saturation level, using the no-filter output coefficient and the integration time coefficient. Further, the gain calculation units 14-1 to 14-5 calculate gains with which the output signals of the pixels 111-1 to 111-5 are equal to or higher than the noise level and equal to or lower than the saturation level, using the no-filter output coefficient and the gain coefficient.

In the second read-out, the reading circuits 110-1 to 110-5 of the color sensor 3 read the output signals of the pixels 111-1 to 111-5 based on the integration times calculated by the integration time calculation units 13-1 to 13-5. Further, the gain circuits 12-1 to 12-5 amplify the output signals of the pixels 111-1 to 111-5 read by the reading circuits 110-1 to 110-5 based on the gains calculated by the gain calculation units 14-1 to 14-5 and cause the resultant signals to be output from the output terminals 17-1 to 17-5. The output levels output from the output terminals 17-1 to 17-5 are the spectral information of the pathological sample. Accordingly, the color sensor 3 can acquire the spectral information of the pathological sample at a valid output level and shorten the time necessary to acquire the spectral information of the pathological sample that is at a valid output level by performing only two read-outs.

Fourth Preferred Embodiment

Figure 15:
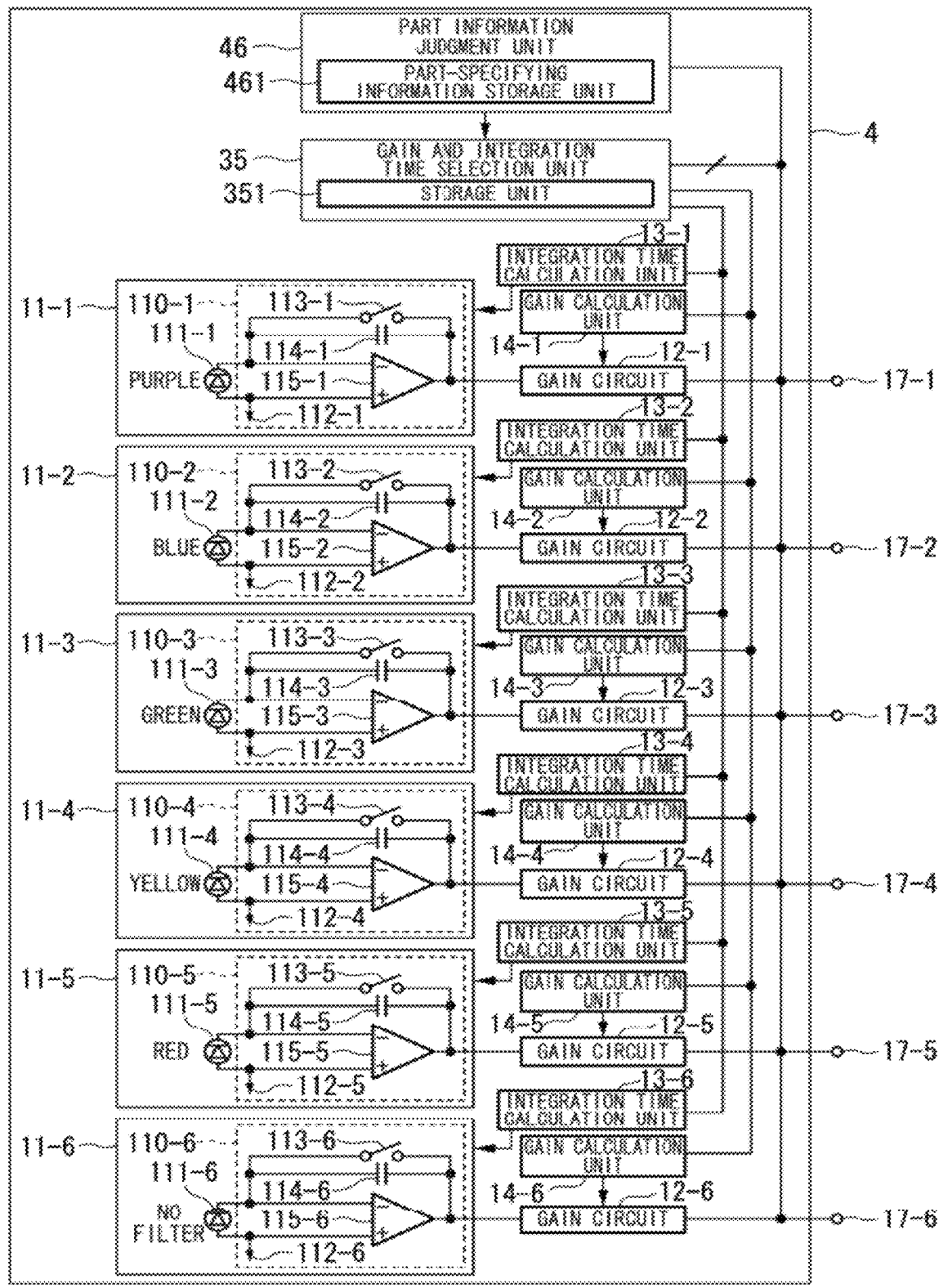
FIG. 15 is a schematic diagram illustrating a configuration of a color sensor in accordance with a fourth preferred embodiment of the present invention.

Next, a fourth preferred embodiment of the present invention will be described with reference to the accompanying drawings. FIG. 15 is a schematic diagram illustrating a configuration of a color sensor 4 in accordance with the fourth preferred embodiment of the present invention. In the shown example, the color sensor 4 includes pixel and reading circuits 11-1 to 11-6, gain circuits 12-1 to 12-6, integration time calculation units 13-1 to 13-6, gain calculation units 14-1 to 14-6, a gain and integration time selection unit 35, a part information judgment unit 46, and output terminals 17-1 to 17-6.

The pixel and reading circuits 11-1 to 11-6, the gain circuits 12-1 to 12-6, the integration time calculation units 13-1 to 13-6, the gain calculation units 14-1 to 14-6, the gain and integration time selection unit 35, and the output terminals 17-1 to 17-6 have the same configurations as in the third preferred embodiment. Further, an arrangement of the pixels 111-1 to 111-6 included in the pixel and reading circuits 11-1 to 11-6 of the color sensor 4 is the same as that of the pixels 111-1 to 111-6 in the third preferred embodiment. Further, spectral characteristics of the pixels 111-1 to 111-6 are the same as those of the pixels 111-1 to 111-6 in the third preferred embodiment. Further, outputs of the gain circuits 12-1 to 12-6 are connected to the part information judgment unit 46, and the outputs of the gain circuits 12-1 to 12-6 are also input to the part information judgment unit 46.

The part information judgment unit 46 includes a part-specifying information storage unit 461 (memory), and specifies part information of a pathological sample based on output values of the gain circuits 12-1 to 12-6 and the part-specifying information stored in the part-specifying information storage unit 461. Further, for the part-specifying information stored in the storage unit 461, the ratio of the signals based on the output signals of the pixels 111-1 to 111-5 and the signal based on the output signal of the pixel 111-6, i.e., a value obtained for each part by dividing signals based on the output signals of the pixels 111-1 to 111-5, which are output by the gain circuits 12-1 to 12-5, by the signal based on the output signal of the pixel 111-6, which is output by the gain circuit 12-6, and the part information are stored and associated with each other.

Hereinafter, a method by which the part information judgment unit 46 specifies the part information of the pathological sample will be described. The part information judgment unit 46 acquires the signals based on the output signals of the pixels 111-1 to 111-6 output by the gain circuits 12-1 to 12-6. The part information judgment unit 46 divides the signals based on the output signals of the pixels 111-1 to 111-5 by the signal based on the output signal of the pixel 111-6 to calculate respective ratios of the signals based on the output signals of the pixels 111-1 to 111-5 and the signal based on the output signal of the pixel 111-6. The part information judgment unit 46 detects a combination closest to a combination of the calculated ratios from the part-specifying information stored in the part-specifying information storage unit 461. The part information judgment unit 46 judges the part information stored in the part-specifying information storage unit 461 to be associated with the detected combination, as the part information of the pathological sample.

Figure 16:
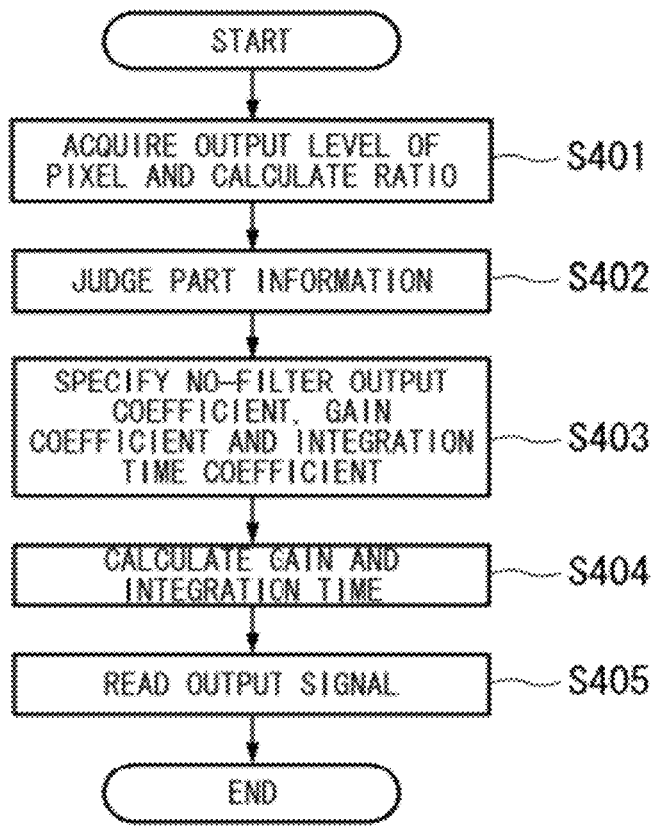
FIG. 16 is a flowchart illustrating an adjustment procedure for the output level of the color sensor in accordance with the fourth preferred embodiment of the present invention.

Next, an adjustment procedure for the output level of the color sensor 4 in the fourth preferred embodiment will be described. FIG. 16 is a flowchart illustrating an adjustment procedure for the output level of the color sensor 4 in accordance with the fourth preferred embodiment of the present invention.
(Step S401)

If acquisition of the spectral information of the pathological sample starts, the first read-out is performed and the part information judgment unit 46 acquires the signals based on the output signals of the pixels 111-1 to 111-6, which are output by the gain circuits 12-1 to 12-6. Further, the part information judgment unit 46 calculates respective ratios of the signals based on the output signals of the pixels 111-1 to 111-5 and the signal based on the output signal of the pixel 111-6. Then, the process proceeds to step S402.
(Step S402)

The part information judgment unit 46 detects a combination closest to a combination of the ratios of the signals based on the output signals of the pixels 111-1 to 111-5 and the signal based on the output signal of the pixel 111-6, which have been calculated in the process of step S401, from the part-specifying information stored in the part-specifying information storage unit 461. The part information judgment unit 46 judges part information stored in the part-specifying information storage unit 461 to be associated with the detected combination, as the part information of the pathological sample. Then, the process proceeds to step S403.
(Step S403)

The gain and integration time selection unit 35 specifies the no-filter output coefficient based on the output level of the reference pixel acquired in step S401. Further, the gain and integration time selection unit 35 selects, for each of the pixels 111-1 to 111-5, a gain coefficient and an integration time coefficient specified by the part information of the pathological sample judged by the part information judgment unit 46 in step S402 from the gain and integration time coefficient table stored in the storage unit 351. Then, the process proceeds to step S404.

The processes of steps S404 to S405 are the same as those of steps S304 to S305 shown in FIG. 14 in the third preferred embodiment.

As described above, according to the fourth preferred embodiment, the first read-out is performed, and the part information judgment unit 46 specifies the part information of the pathological sample. Thereby, the color sensor 4 can specify the part information of the subject without the user inputting the part information. Accordingly, the color sensor 4 in the fourth preferred embodiment has an effect of a simplified user manipulation, in addition to the effects of the color sensor 3 in the third preferred embodiment.

Fifth Preferred Embodiment

Figure 17:
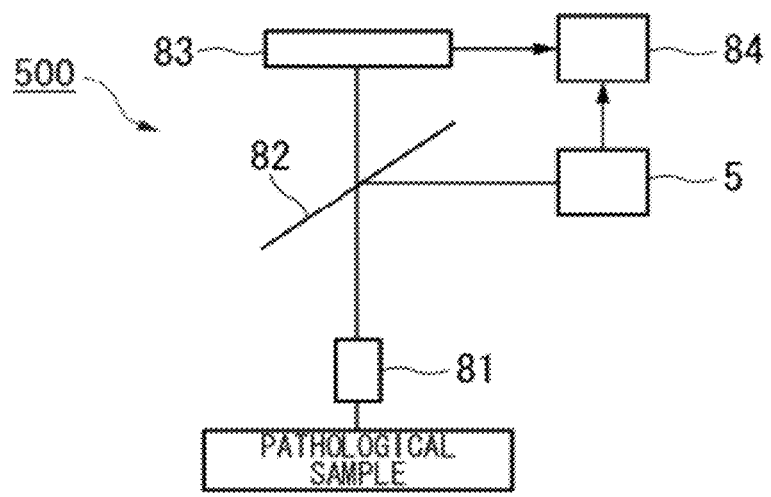
FIG. 17 is a block diagram illustrating a configuration of a virtual slide apparatus in accordance with a fifth preferred embodiment of the present invention.
Figure 18:
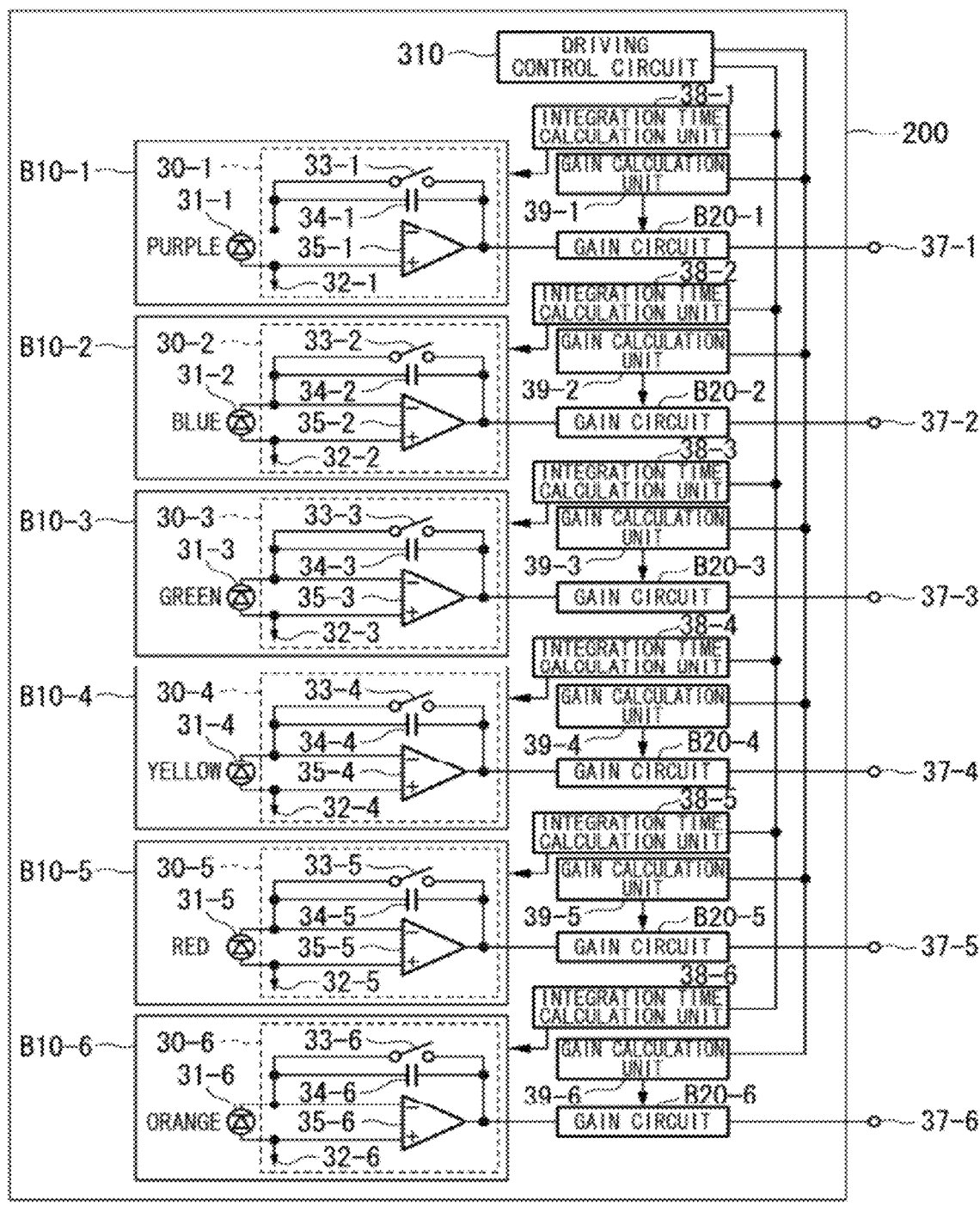
FIG. 18 is a schematic diagram illustrating a configuration of a color sensor in accordance with the related art.
Figure 19:
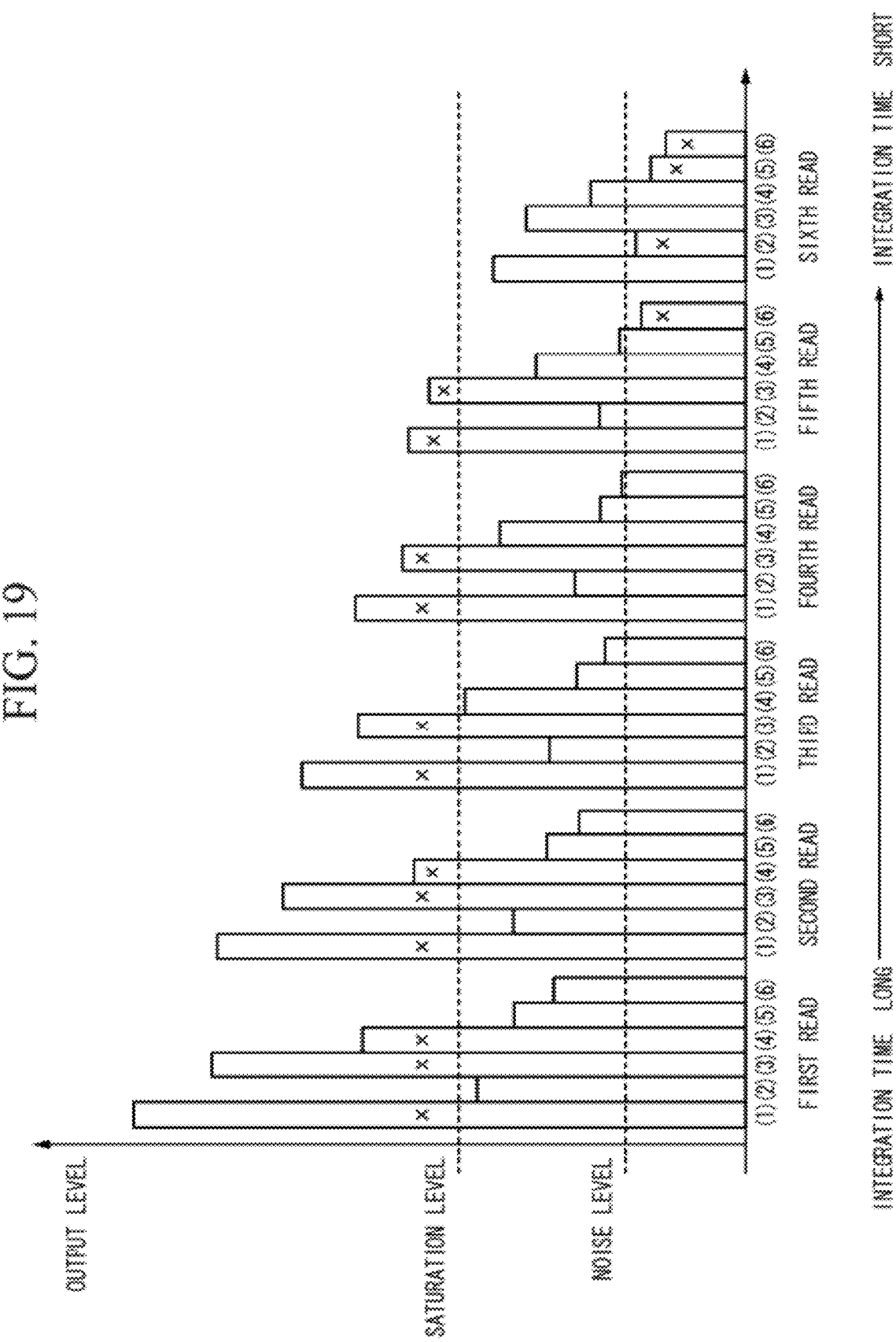
FIG. 19 is a graph illustrating an example of output levels of signals output from the color sensor in accordance with the related art.

Next, a fifth preferred embodiment of the present invention will be described. FIG. 17 is a block diagram illustrating a configuration of a virtual slide apparatus in accordance with the fifth preferred embodiment of the present invention. In the shown example, the virtual slide apparatus 500 includes a color sensor 5, an objective lens 81, a half mirror 82, an RGB image sensor 83, and an image processing unit 84.

The color sensor 5 is the same as any of the color sensors 1 to 4 described in the first to fourth preferred embodiments, and can acquire the spectral information of the pathological sample at a valid output level and shorten a time necessary to acquire the spectral information of the pathological sample that is at a valid output level. The objective lens 81 concentrates light radiated onto the pathological sample. The half mirror 82 divides objective lens colored light in directions of the color sensor 5 and the RGB sensor 83. The RGB image sensor 83 generates an image based on a pathological sample image projected via the objective lens 81 and the half mirror 82. The image processing unit 84 performs image processing, such as correction, on the image acquired by the RGB image sensor 83 based on the spectral information of the pathological sample acquired by the color sensor 5.

As described above, according to the fifth preferred embodiment, the color sensor 5 can acquire the spectral information of the pathological sample at a valid output level and shorten a time necessary to acquire the spectral information of the pathological sample that is at a valid output level. Thereby, the virtual slide apparatus 500 can more rapidly acquire a corrected image.

While preferred embodiments of the present invention have been described and illustrated above, it should be understood that these are examples of the present invention and are not to be considered as limiting. Additions, omissions, substitutions, and other modifications can be made without departing from the scope of the present invention.

For example, in the above-described examples, each of the color sensors 1 to 5 includes the five pixels 111-1 to 111-5 as pixels having a filter coated thereon. However, the present invention is not limited to these examples and each of the color sensors 1 to 5 may include a plurality of pixels having a filter coated thereon.

Accordingly, the invention is not to be considered as being limited by the foregoing description, and is only limited by the scope of the claims.

What is claimed is:
1. A method comprising:
a first step of selecting a type of a target sample from a plurality of sample type candidates;
a second step of measuring a first output level of a reference pixel, the first output level being based on light from the target sample incident on the reference pixel, the reference pixel being irradiated the light from the target sample via a transparent filter;
a third step of measuring a second output level of a measurement pixel, the second output level being based on the light from the target sample incident on the measurement pixel, the measurement pixel being irradiated the light from the target sample via a color filter;
a fourth step of selecting a level adjustment parameter from a plurality of level adjustment parameter candidates, the selected level adjustment parameter being associated with the selected type of the target sample;
a fifth step of calculating using a processor a level adjustment amount from both of the level adjustment parameter and the first output level of the reference pixel; and
a sixth step of adjusting the second output level using the level adjustment amount when measuring an output level corresponding to the light from the target sample incident on the measurement pixel.
2. The method according to claim 1, wherein
a plurality of measurement pixels are provided,
the plurality of measurement pixels have different spectral sensitivity characteristics, and
the reference pixel has a higher sensitivity than the plurality of measurement pixels at all detection wavelengths.
3. The method according to claim 1, wherein
the measuring of the output level comprises accumulating a signal output by the measurement pixel in an accumulation unit and measuring the output level based on a signal amount according to an accumulation time for which the signal is accumulated in the accumulation unit,
the level adjustment parameter is a coefficient according to a wavelength of the light detected by the measurement pixel, and
the level adjustment amount is the accumulation time.
4. The method according to claim 1, wherein
the measuring of the output level comprises measuring an output level based on a signal obtained by an amplification unit amplifying a signal output by the measurement pixel,
the level adjustment parameter is a coefficient according to a wavelength of the light detected by the measurement pixel, and
the level adjustment amount is a gain of the amplification unit.
5. The method according to claim 1, wherein
the measuring of the output level comprises accumulating a signal output by the measurement pixel in an accumulation unit, and measuring an output level based on a signal level obtained by an amplification unit amplifying a signal level based on a signal amount according to an accumulation time for which the signal is accumulated in the accumulation unit, the level adjustment parameter is a coefficient according to a wavelength of the light detected by the measurement pixel, and the level adjustment amount is a set of the accumulation time and the gain of the amplification unit.

6. The method according to claim 1, wherein the type candidates of the plurality of samples are classified depending on at least one of an extracted part of the target sample and a dyeing method for the target sample.

7. The method according to claim 1, wherein the first step further comprises reading code information for specifying the target sample and selecting a type of the target sample specified by the code information.

8. The method according to claim 1, wherein the first step further comprises searching for the type candidates of the plurality of samples stored in a memory and selecting the type of the target sample.

9. A color sensor comprising:

a part information input unit configured to select a type of a target sample from a plurality of sample type candidates;

a reference pixel on which light from the target sample is incident via a transparent filter, the reference pixel generating a reference output signal;

a first measurement unit configured to measure an output level of the output signal generated by the reference pixel;

a measurement pixel on which the light from the target sample is incident via a color filter, the measurement pixel generating a measurement output signal corresponding to a spectrum of the target sample;

a second measurement unit configured to measure spectral information of the target sample based on the measurement output signal generated by the measurement pixel;

a selection unit configured to select a level adjustment parameter from a plurality of level adjustment parameter candidates, the selected level adjustment parameter being associated with the selected type of the target sample; and a processor configured to calculate a level adjustment amount of the measurement pixel from both of the level adjustment parameter and the reference output level, wherein the second measurement unit adjusts an output level of the output signal using the level adjustment amount calculated by the calculation unit when measuring the spectral information.

10. A virtual slide apparatus comprising a color sensor according to claim 9.

* * * * *